US012792372B2

(12) United States Patent
Morariu et al.

(10) Patent No.: US 12,792,372 B2
(45) Date of Patent: Nov. 10, 2026

(54) COLLABORATIVE MIXED-MEDIA TUTORIAL CREATION

(71) Applicant: Adobe Inc., San Jose, CA (US)

(72) Inventors: Vlad Ion Morariu, Potomac, MD (US); Yuexi Chen, College Park, MD (US); Zhicheng Liu, Clarksville, MD (US)

(73) Assignee: Adobe Inc., San Jose, CA (US)

( * ) Notice: Subject to any disclaimer, the term of this patent is extended or adjusted under 35 U.S.C. 154(b) by 280 days.

(21) Appl. No.: 18/755,307

(22) Filed: Jun. 26, 2024

(65) Prior Publication Data

US 2026/0003652 A1 Jan. 1, 2026

(51) Int. Cl.
*G06F 9/451* (2018.01)

(52) U.S. Cl.
CPC .................................... *G06F 9/453* (2018.02)

(58) Field of Classification Search
CPC ........................................................ G06F 9/453
See application file for complete search history.

(56) References Cited

U.S. PATENT DOCUMENTS

| | | | | |
|---|---|---|---|---|
| 8,750,782 | B2 * | 6/2014 | Scandura | G09B 7/00 434/350 |
| 10,073,861 | B2 * | 9/2018 | Shamir | G06F 16/4393 |
| 10,901,762 | B1 * | 1/2021 | Kuklinski | H04N 21/4788 |
| 11,119,727 | B1 * | 9/2021 | Gupta | G10L 25/48 |
| 11,270,123 | B2 * | 3/2022 | Sureshkumar | H04N 21/4398 |
| 11,372,871 | B1 * | 6/2022 | Tracey | G06F 16/2477 |
| 11,955,025 | B2 * | 4/2024 | Aoki | G09B 5/06 |
| 12,339,859 | B2 * | 6/2025 | Tracey | G06F 11/3006 |
| 2015/0153906 | A1 * | 6/2015 | Liao | G06F 16/70 715/709 |
| 2017/0068643 | A1 * | 3/2017 | Shamir | G06F 16/4393 |
| 2019/0287197 | A1 * | 9/2019 | Chang | G09B 5/06 |
| 2020/0185006 | A1 * | 6/2020 | Tene | G11B 27/102 |
| 2022/0284019 | A1 * | 9/2022 | Tracey | G06F 11/3006 |
| 2023/0093571 | A1 * | 3/2023 | Aoki | G09B 5/06 |
| 2023/0161466 | A1 * | 5/2023 | Singh | G06F 3/0482 715/765 |

(Continued)

OTHER PUBLICATIONS

Adobe Labs , "Project Blink", [retrieved from the internet on Sep. 23, 2024], <https://labs.adobe.com/projects/blink/>, Oct. 18, 2022, 8 pages.

(Continued)

*Primary Examiner* — Kenny Nguyen
(74) *Attorney, Agent, or Firm* — FIG. 1 Patents

(57) ABSTRACT

Techniques for collaborative mixed-media tutorial creation are described for enabling efficient creation and consumption of tutorial content. In an example, a processing device is operable to receive tutorial content from one or more media sources and identify a plurality of procedural steps and a plurality of objects from the tutorial content using machine-learning. The processing device is further operable to determine a plurality of dependencies between the plurality of procedural steps and the plurality of objects, generate a graph-based data structure of the tutorial content having a plurality of nodes interconnected by a plurality of edges based on the plurality of steps, the plurality of objects, and the plurality of dependencies, and present a graph-based representation of the graph-based data structure for display in a user interface.

11 Claims, 13 Drawing Sheets

(56) References Cited

U.S. PATENT DOCUMENTS

| | | | | |
|---|---|---|---|---|
| 2023/0247073 | A1* | 8/2023 | Yu | G06V 20/52 348/14.08 |
| 2024/0169732 | A1* | 5/2024 | Dvornik | G06F 16/735 |
| 2024/0273430 | A1* | 8/2024 | Maggiore | G06F 40/103 |
| 2025/0060950 | A1* | 2/2025 | Pinkerton | G06F 3/04842 |
| 2025/0200626 | A1* | 6/2025 | Gopal | G06F 16/538 |
| 2025/0225609 | A1* | 7/2025 | Reddy | G06V 10/56 |
| 2025/0245137 | A1* | 7/2025 | Gordon | G06F 11/3476 |
| 2025/0265812 | A1* | 8/2025 | Hansson | G06V 10/764 |
| 2025/0304256 | A1* | 10/2025 | Kang | G06V 10/70 |
| 2026/0065196 | A1* | 3/2026 | Humml | G06Q 10/06316 |

OTHER PUBLICATIONS

Akbik, Alan , et al., "Contextual String Embeddings for Sequence Labeling", International Conference on Computational Linguistics, [retrieved from the internet on Sep. 23, 2024], <https://alanakbik.github.io/papers/coling2018.pdf>, 2018, 12 pages.

Chen, Yuexi , et al., "TutoAI: A Cross-domain Framework for AI-assisted Mixed-media Tutorial Creation on Physical Tasks", Cornell University, arXiv.org, [retrieved from the internet on Sep. 23, 2024], <https://arxiv.org/abs/2403.08049>, Mar. 12, 2024, 17 pages.

Facebook , "Hugging Face", [retrieved from the internet on Sep. 23, 2024], <https://huggingface.co/facebook/detr-resnet-50>, 2024, 7 pages.

github.com , "TransNet V2: Shot Boundary Detection Neural Network", [retrieved from the internet on Sep. 23, 2024], <https://github.com/soCzech/TransNetV2>, 2024, 3 pages.

Nawhal, Megha , et al., "VideoWhiz: Non-Linear Interactive Overviews for Recipe Videos", Graphics Interface, [retrieved from the internet on Sep. 23, 2024], <https://ixlab.cs.sfu.ca/static/img/siteAssets/publications/videowhiz-non-linear-interactive-overviews-for-recipe-videos/NawhalGI2019.pdf>, 2019, 8 pages.

Truong, Anh , et al., "Automatic Generation of Two-Level Hierarchical Tutorials from Instructional Makeup Videos", Proceedings of the 2021 CHI Conference on Human Factors in Computing Systems [retrieved Jun. 14, 2022]. Retrieved from the Internet <https://storage.googleapis.com/pub-tools-public-publication-data/pdf/d6635d0826cf29c217653bc4976d5c234713b249.pdf>., May 7, 2021, 16 Pages.

Wikihow , "Easy Ways to Add Chapters to YouTube Videos", [retrieved from the internet on Sep. 23, 2024]. <https://www.wikihow.com/Add-Chapters-to-YouTube-Video>, Aug. 16, 2024, 16 pages.

Yang, Saelyne , et al., "Improving Video Interfaces by Presenting Informational Units of Videos", CHI '22 Extended Abstracts,[retrieved from the internet on Sep. 23, 2024], <https://kixlab.github.io/website-files/2022/chi2022-workshop-StarLab-paper.pdf>, Apr. 29, 2022, 5 pages.

* cited by examiner

COLLABORATIVE MIXED-MEDIA TUTORIAL CREATION

BACKGROUND

Tutorials and procedural instructions are popular examples of digital content that is consumed from the internet. Online media publishers generate mixed-media tutorials, which combine multiple types of media (e.g., text, imagery, audio, video) into a downloadable package of tutorial content. However, tutorial content in conventional scenarios of mixed-media tutorials is usually formatted for consumption in a single way. Accordingly, conventional tutorial content is incapable of adapting to a particular learning style. For example, some users prefer to digest tutorial content linearly, e.g., from start to finish. Other users prefer to learn by skipping over specific parts, repeating sections, or otherwise consuming tutorial content in a non-linear manner.

SUMMARY

Techniques for collaborative mixed-media tutorial creation are described for improving creation and consumption experiences of cross-media tutorials used for learning physical tasks. In an example, a content processing system generates cross-media tutorials to be compact and sharable data structures that combine tutorial content extracted from multiple media sources (e.g., video, video transcript, audio, imagery, text) into a single source of information for learning. The content processing system uses one or more machine-learning pipelines to extract and organize the raw tutorial content into a graph-based data structure that facilitates both linear and non-linear consumption, e.g., learning one step at a time versus skipping around to learn the steps in any order. At different points in the creation process, user inputs are received to add, remove, or modify the information pre-populated within the graph-based data structure by the machine-learning pipelines. In this way, the disclosure facilitates human-machine collaborations for efficiently creating helpful cross-media tutorials that accommodate a variety of learning styles.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
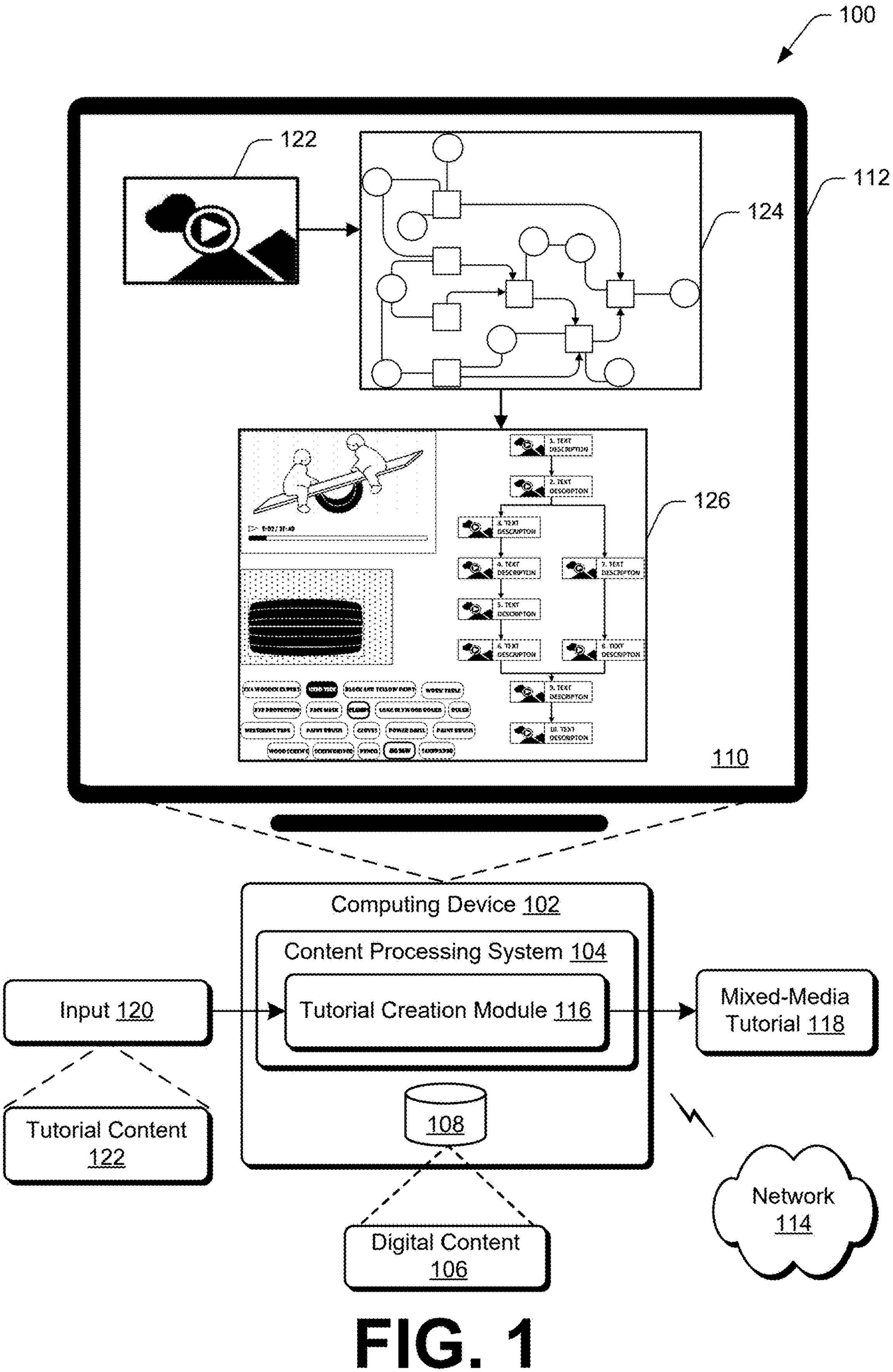
FIG. 1 is an illustration of a digital medium environment in an example implementation that is operable to employ techniques described herein for collaborative mixed-media tutorial creation.

Mixed-media tutorials integrate videos, images, text, diagrams and/or other types of media into tutorial content for teaching procedures and skills. However, conventional techniques used to support manual creation of a mixed-media tutorial are tedious and prone to error. Conventional techniques that automate aspects of the creation process are restricted to specific media types or rely on extensive user inputs from a human author to fix errors and refine the tutorial content. Whether created manually or using automation, conventional mixed-media tutorials do not support multiple consumption experiences, e.g., both linear and non-linear consumption of the tutorial content. Consequently, learning experiences supported by conventional mixed-media tutorials adhere to specific timelines and/or specific sequencings of procedural steps defined by the different media types or by authoring decisions made when the mixed-media tutorials are created.

Accordingly, techniques for collaborative mixed-media tutorial creation are described for enabling efficient creation, and flexible understanding of tutorial content generated from multiple media types. The described techniques enable human and machine collaborations that simplify how mixed-media tutorials are authored including to organize tutorial content in unrestricted ways that support both linear and non-linear consumption.

In an example, a computing device receives, as input, tutorial content from one or more media sources. The tutorial content, for instance, includes one or more of video data, image data, audio data, text data, haptic-feedback data, document data, diagram data, and presentation data. In this example, the tutorial content includes a video about making cookies including embedded audio or captioned text that narrates the visuals provided in the video. Machine-learning is used to automate aspects of the authoring process. The computing device executes a machine-learning pipeline including one or more machine-learning models trained to identify tutorial components from the tutorial content, such as a plurality of procedural steps and a plurality of objects (e.g., tools, materials, ingredients, items) used to perform the procedural steps. In this example, the machine-learning pipeline outputs a sequence of cooking steps derived from the video, audio, and/or captioned text to define how to make the cookies. The machine-learning pipeline outputs a set of objects including baking tools and ingredients that are used in the baking process. In one or more aspects, the objects are classified by the machine-learning pipeline. These object classifications are matched to descriptions of the procedural steps for determining a plurality of dependencies between the different aspects of the tutorial content. For example, the steps of the baking process are matched to one or more of the baking tools and ingredients included in the objects.

The computing device combines the procedural steps, the objects, and the dependencies into a graph-based data structure that facilitates a variety of consumption experiences. For example, a graph-based data structure has a plurality of nodes interconnected by a plurality of edges. The nodes represent the plurality of steps and the plurality of objects, and the edges represent the dependencies or relationships between the plurality of steps and the plurality of objects. In the baking example, the graph-based data structure includes nodes for each of the baking steps and nodes for each of the baking tools and ingredients. Dependencies in the graph-based data structure indicate which tools and ingredients are used in each of the baking steps. The machine-learning pipeline automatically pre-populates the graph-based data structure to provide a starting point for authoring a graph-based representation of the mixed-media tutorial (e.g., about baking).

The graph-based representation is editable from a user interface to facilitate authoring with ease, including to edit the tutorial elements of the graph-based data structure and the tutorial content contained therein. For example, from the user interface, an author of the mixed-media tutorial provides inputs to edit the object classifications, the descriptions of the procedural steps, and/or the relationships between the objects and the procedural steps. User inputs cause modifications to nodes and edges of the graph-based data structure thereby improving accuracy of the procedural steps, the objects, and the dependencies initially populated by the machine-learning pipeline. As the graph-based representation is edited, a user author is able to preview how the tutorial content is presented to test compatibility with different learning styles.

Once finalized, the graph-based representation is packaged and stored by the computing device in a compact and sharable data structure. The compact data structure promotes linear and non-linear consumption of the mixed-media tutorial from a variety of computing environments, including mobile devices. In at least one variation, the final data structure is output from the computing device (e.g., to an online publisher) to enable consumption of the mixed-media tutorial by users of other computing devices, such as a remote device on a network.

The tutorial content conveyed in the graph-based representation is both linearly and non-linearly accessible from the data structure, which promotes end-user consumption in accordance with a variety of learning styles. In this way, the disclosure facilitates human-machine collaborations for efficiently creating helpful cross-media tutorials that accommodate a variety of learning styles.

Further discussion of these and other examples and advantages are included in the following sections and shown using corresponding figures. In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Collaborative Mixed-Media Tutorial Creation Environment

FIG. 1 is an illustration of a digital medium environment 100 in an example implementation that is operable to employ techniques described herein for collaborative mixed-media tutorial creation. The environment 100 includes a computing device 102, which is configurable in a variety of ways.

The computing device 102, for instance, is configurable as a processing device such as a desktop computer, a laptop computer, a mobile device (e.g., assuming a handheld configuration such as a tablet or mobile phone), and so forth. Thus, the computing device 102 ranges from full resource devices with substantial memory components and processor resources (e.g., personal computers, game consoles) to a low-resource device with limited memory and/or processing resources, e.g., mobile devices. Additionally, although a single computing device 102 is shown, the computing device 102 is also representative of a plurality of different devices (e.g., a computing system), such as multiple servers utilized by a business to perform operations "over the cloud" as described in FIG. 13.

The computing device 102 is illustrated as including a content processing system 104. The content processing system 104 is implemented at least partially in hardware of the computing device 102 to process and transform digital content 106, which is illustrated as being maintained in storage 108 of the computing device 102. Such processing includes creation of the digital content 106, modification of the digital content 106, and production of the digital content 106 for presentation in a user interface 110, e.g., for output by a display device 112. Although illustrated as implemented locally at the computing device 102, functionality of the content processing system 104 is also configurable in whole or in part through functionality available via the network 114, such as part of a web service or "in the cloud".

An example of functionality incorporated by the content processing system 104 for processing the digital content 106 is illustrated as a tutorial creation module 116. The tutorial creation module 116 is configured to generate a mixed-media tutorial 118 based on an input 120 that includes various types of tutorial content 122 obtained from one or more media sources. In at least one implementation, the tutorial creation module 116 outputs the mixed-media tutorial 118. For example, the computing device 102 causes the display device 112 to present the mixed-media tutorial 118 in the user interface 110. From the user interface 110, a graphical representation of the mixed-media tutorial 118 is usable to further learning concepts or performing physical tasks. User inputs received at the user interface 110, for instance, are usable by the computing device 102 to cause the graphical representation of the mixed-media tutorial 118 to output detailed information about the tutorial content 122. When presented in the user interface 110, the detailed information output from the tutorial content 122 is usable for learning the concepts or understanding different procedural steps and objects involved with performing the physical tasks.

The tutorial content 122 received by the tutorial creation module 116 includes media obtained from one or more media sources. As some non-limiting examples, the tutorial content 122 and media sources from which the tutorial content 122 is received, includes one or more of video data from video sources, image data from image sources, audio data from audio sources, text data from text sources, haptic-feedback data from haptic-feedback sources, document data or diagram data from document sources, and presentation data from presentation sources. The tutorial content 122, in one example, includes multiple types of media obtained from a single media source, such as audio data, video data, image data, and text data obtained from a video source. In another example, the tutorial content 122 includes one or more media types obtained from multiple media sources, e.g., an audio track and text captions are embedded in a single video file of video segments.

In the illustrated example, the tutorial creation module 116 receives the tutorial content 122, which includes a video tutorial for constructing a seesaw using a tire for a central pivot. Based on the tutorial content 122, the tutorial creation module 116 is operable to generate the mixed-media tutorial 118 to present the procedural steps and associated objects (e.g., tools, equipment, materials, ingredients) mentioned in the video tutorial for building the seesaw. For instance, the tutorial creation module 116 produces the mixed-media tutorial 118 using machine-learning to generate a graph-based data structure 124 of the tutorial content 122, which is maintained in the storage 108.

The tutorial creation module 116 executes one or more machine-learning models that are trained to populate the graph-based data structure 124. The graph-based data structure 124 is formed to have nodes that represent the tutorial elements and edges that indicate relationships between the tutorial elements. In one or more aspects, each of the procedural steps is represented in the graph-based data structure 124 using a different corresponding step node. Likewise, each of the objects, materials, and ingredients is maintained in a separate, corresponding object node. In one variation, rather than include object nodes, attributes of the step nodes are used in the graph-based data structure 124 to indicate the objects, equipment, tools, items, materials, and ingredients used to perform the corresponding procedural steps. As one example, the graph-based data structure 124 is a bipartite graph that includes edges between nodes associated with sequential procedural steps in addition to edges between nodes representing objects and nodes associated with the procedural steps where the objects are used.

In the illustrated example, the machine-learning models executed by the tutorial creation module 116 extract the tutorial elements to include video segments determined from the seesaw video tutorial. The tutorial creation module 116 executes the machine-learning models to apply natural language processing techniques, vision segmentation techniques, object recognition/classification techniques, and other multimodal algorithms to segment the seesaw video, identify objects used in construction, and summarize procedural steps derived from transcribed text. The tutorial creation module 116 causes step nodes of the graph-based data structure 124 to contain the video segments including images (e.g., thumbnails) and associated text, e.g., descriptions of the video segments, transcription of audio associated with the video segments. The tutorial creation module 116 causes object nodes of the graph-based data structure 124 to contain individual objects shown in the video segments and/or referenced in the associated text contained in the step nodes. Dependencies between the step nodes and the object nodes are inserted into the graph-based data structure 124 by the tutorial creation module 116. For example, the machine-learning models executed by the tutorial creation module 116 infer a set of instructions composed of procedural steps associated with the step nodes. An order of the procedural steps is inferred to determine edge dependencies between step nodes. Object node dependencies for each of the step nodes are determined based on matches between the object nods and the objects, materials, and/or ingredients referenced in the steps.

From the graph-based data structure 124, the tutorial creation module 116 produces a graph-based representation 126 of the mixed-media tutorial 118. The graph-based representation 126 is output for display in the user interface 110 to depict the procedural steps, the objects, and relationships or dependencies between the steps and objects, in format that is consumable in both linear and non-linear ways. The graph-based representation 126 allows users to view the graph-based data structure 124, preview different consumption experiences (e.g., linear, non-linear), and modify the graph-based data structure 124 based on user inputs to improve the tutorial content within the nodes and edges automatically populated using machine-learning. In one or more examples, the user interface 110 includes cues to guide authors of the mixed-media tutorial 118 through a multi-step process for improving the graph-based representation 126. For example, the user interface 110 receives user inputs to allow coarse edits where thresholds are modified (e.g., video temporal boundaries, object bounding boxes, object filters). The modifications change a topology of the graph-based data structure 124, such as a quantity of step nodes, object nodes, and/or edges between the nodes. After the coarse edits, the user interface 110 prompts the user with cues to cause fine edits to the graph-based representation 126. As one example, the fine edits include changing video segment boundaries, adding/removing video segments, adding/removing/renaming objects for a segment, adding/removing dependency relationships between segments, editing auto-generated descriptions for a segment, and so forth.

The tutorial creation module 116 packages the graph-based representation 126 into a compact and sharable data structure that is output as the mixed-media tutorial 118. For example, a remote device receives the mixed-media tutorial 118 from the computing device 102 via a connection over the network 114. During consumption of the mixed-media tutorial 118 at the remote device, the graph-based representation 126 is output for display to be used for satisfying linear and non-linear consumption experiences. When presented in a user interface of the remote device, the graph-based representation 126 allows users to view an overview of the mixed-media tutorial 118, and easily dive deeper (e.g., on-demand) into details of the mixed-media tutorial 118 (e.g., view additional text, view thumbnails) to quickly navigate to relevant aspects of the tutorial content 122 embedded therein.

The techniques described herein overcome limitations of conventional techniques for creating mixed-media tutorials that are computationally expensive and/or rely on extensive and tedious manual inputs. Further discussion of these and other advantages is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Example Architecture of Collaborative Mixed-Media Tutorial Creation

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not limited to the orders shown for performing the operations by the respective blocks.

Figure 2:
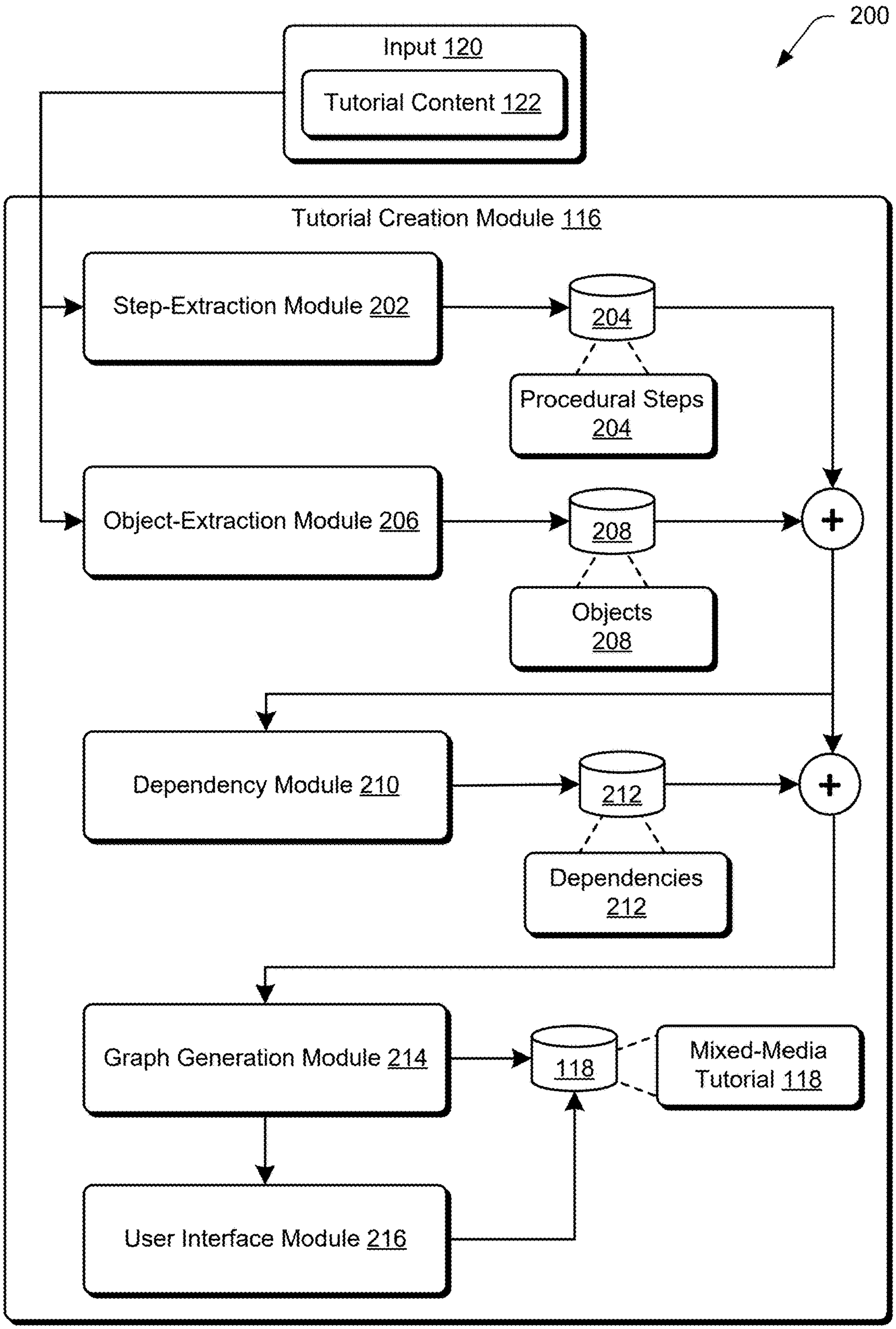
FIG. 2 depicts a system as an example implementation of a tutorial creation module that is operable to employ techniques described herein for collaborative mixed-media tutorial creation.

FIG. 2 depicts a system 200 as an example implementation of a tutorial creation module that is operable to employ techniques described herein for collaborative mixed-media tutorial creation. For example, the system 200 depicts the tutorial creation module 116 in greater detail than in FIG. 1.

As shown in FIG. 2, the tutorial creation module 116 includes a step-extraction module 202 configured to output procedural steps 204 derived from the tutorial content 122 received from the input 120. Details of the step-extraction module 202 are given in the description of FIG. 5. In general, the step-extraction module 202 applies machine-learning to derive the procedural steps 204 from the tutorial content 122. As one example, the step-extraction module 202 predicts boundaries around portions of the tutorial content 122 associated with the procedural steps 204, individually. For instance, the step-extraction module 202 segments a video tutorial into multiple video segments and corresponding transcription portions derived from audio of the video tutorial.

The tutorial creation module 116 also includes an object-extraction module 206 configured to output objects 208 derived from the tutorial content 122 received from the input 120. Details of the object-extraction module 206 are provided in the description of FIG. 9. In general, the object-extraction module 206 applies machine-learning to derive the objects 208 from the tutorial content 122. As one example, the object-extraction module 206 predicts boundaries around portions of the tutorial content 122 associated with the objects 208, individually. For instance, the object-extraction module 206 recognizes objects from the video tutorial and applies bounding boxes around the objects detected in the video frames. The object-extraction module 206 analyzes the transcription or uses natural language processing of the audio to identify the objects 208 as tools, materials, ingredients, or other items mentioned in the video tutorial.

As further shown in FIG. 2, the tutorial creation module 116 includes a dependency module 210 configured to output dependencies 212 between the procedural steps 204, between the objects 208, and between the procedural steps 204 and the objects 208. Details of the dependency module 210 are given in the description of FIG. 11. In general, the dependency module 210 applies machine-learning to derive the dependencies as relationships inferred from the tutorial content 122 between the procedural steps 204 and the object 208. As one example, the dependency module 210 matches descriptions of the objects 208 to descriptions of the procedural steps 204. The dependency module 210 determines an order for the procedural steps 204, which is often different than an order captured in the tutorial content 122. For example, the dependency module 210 determines one of the dependencies 212 based on a text description of one of the procedural steps 204 that correlates or mentions ideas contained in a text description of another of the procedural steps 204. As another example, the dependency module 210 determines one of the dependencies 212 based on a text description of one of the procedural steps 204 that correlates or mentions a text description of one or more of the objects 208. In an additional example, the dependency module 210 determines an object name or classification of one of the objects 208 that is often associated with an object name or classification of another one of the objects 208.

The tutorial creation module 116 includes a graph generation module 214 configured to output the mixed-media tutorial 118 based on the procedural steps 204, the objects 208, and the dependencies 212. For example, the graph generation module 214 constructs the graph-based data structure 124 using the procedural steps 204 and the objects 208 as nodes, and further using the dependencies as edges that connect two or more of the nodes. The graph generation module 214 constructs the graph-based representation 126 of the tutorial content 122 based on the graph-based data structure 124.

A user interface module 216 of the tutorial creation module 116 is configured to present the graph-based representation 126 in the user interface 110. The user interface module 216 process user inputs received from the user interface 110 to modify the graph-based data structure 124 or otherwise interact with the tutorial content 122 embedded therein. For example, the user interface module 216 processes user inputs for revising content of the mixed-media tutorial 118 (e.g., the graph-based data structure 124) created automatically using the machine-learning applied by the other modules of the tutorial creation module 116 mentioned above. Operations of the user interface module 216 are made clear in the descriptions of FIGS. 3, 4, 6-8, and 10.

As used herein, the term "machine-learning" refers to executing one or more machine-learning models, which are computer representations that are tunable (e.g., through training and retraining) based on inputs without being actively programmed by a user to approximate unknown functions, automatically and without user intervention. In particular, the term machine-learning model includes a model that utilizes algorithms to learn from, and make predictions on, known data by analyzing training data to learn and relearn how to generate outputs that reflect patterns and attributes of the training data. Non-limiting examples of machine-learning models employed by the tutorial creation module 116 include convolutional neural networks (CNNs), transformers, long short-term memory (LSTM) neural networks, generative adversarial networks (GANs), decision trees, support vector machines, linear regressions, logistic regressions, Bayesian networks, random forest learning models, dimensionality reduction algorithms, boosting algorithms, deep learning neural networks, etc.

In the illustrated example, the machine-learning models of the tutorial creation module 116 are configured using a plurality of layers having, respectively, a plurality of nodes. The plurality of layers are configurable to include an input layer, an output layer, and one or more hidden layers.

Calculations are performed by the nodes within the layers via hidden states through a system of weighted connections that are "learned" during training and retraining of the neural representation to implement a variety of tasks.

To train the machine-learning models of the tutorial creation module 116, training data is received that provides examples of "what is to be learned" by that respective neural representation, i.e., as a basis to learn patterns from the data. The machine-learning models of the tutorial creation module 116, for instance, collect and preprocess other examples of the tutorial content 122 as the training data to include input features and corresponding target labels, i.e., of what is exhibited by the input features. The machine-learning models of the tutorial creation module 116 then initialize parameters of the machine-learning models of the tutorial creation module 116, which are used as internal variables to represent and process information during training and represent interferences gained through training. In an implementation, the training data for each of the machine-learning models of the tutorial creation module 116 described herein is separated into batches to improve processing and optimization efficiency of the parameters during training.

Training data is received as an input by each the machine-learning models of the tutorial creation module 116 and used as a basis for generating predictions based on a current state of parameters of layers and corresponding nodes, a result of which is output as output data. Output data describes an outcome of the task, e.g., as a probability of being a member of a particular class in a classification scenario.

Training of the machine-learning models of the tutorial creation module 116 described herein includes calculating a loss function to quantify a loss associated with operations performed by nodes of the neural representations. The calculating of the loss function, for instance, includes implementing functions for comparing a difference between predictions specified in the output data from the machine-learning models of the tutorial creation module 116 with target labels specified by the training data. The loss function is configurable in a variety of ways, examples of which include regret, Quadratic loss function as part of a least squares technique, and so forth.

Calculation of the loss function also includes use a backpropagation operation as part of minimizing the loss function and thereby training parameters of the neural representations. Minimizing the loss function, for instance, includes adjusting weights of the nodes to reduce the loss and thereby optimize performance of the machine-learning models in performance of a particular task. The adjustment is determined by computing a gradient of the loss function, which indicates a direction to be used to adjust the parameters to reduce the loss. The parameters of the machine-learning models of the tutorial creation module 116 are then updated based on the computed gradient.

This process continues over a plurality of iterations in an example until the machine-learning models of the tutorial creation module 116 determine that a stopping criterion is met. The stopping criterion is employed by the machine-learning models in this example to reduce computational resource consumption, and/or promote an ability of the machine-learning models to address previously unseen data, i.e., that is not included specifically as an example in the training data. Examples of a stopping criterion include but are not limited to a predefined number of epochs, validation loss stabilization, achievement of a performance improvement threshold, or based on performance metrics such as precision and recall.

Figure 3:
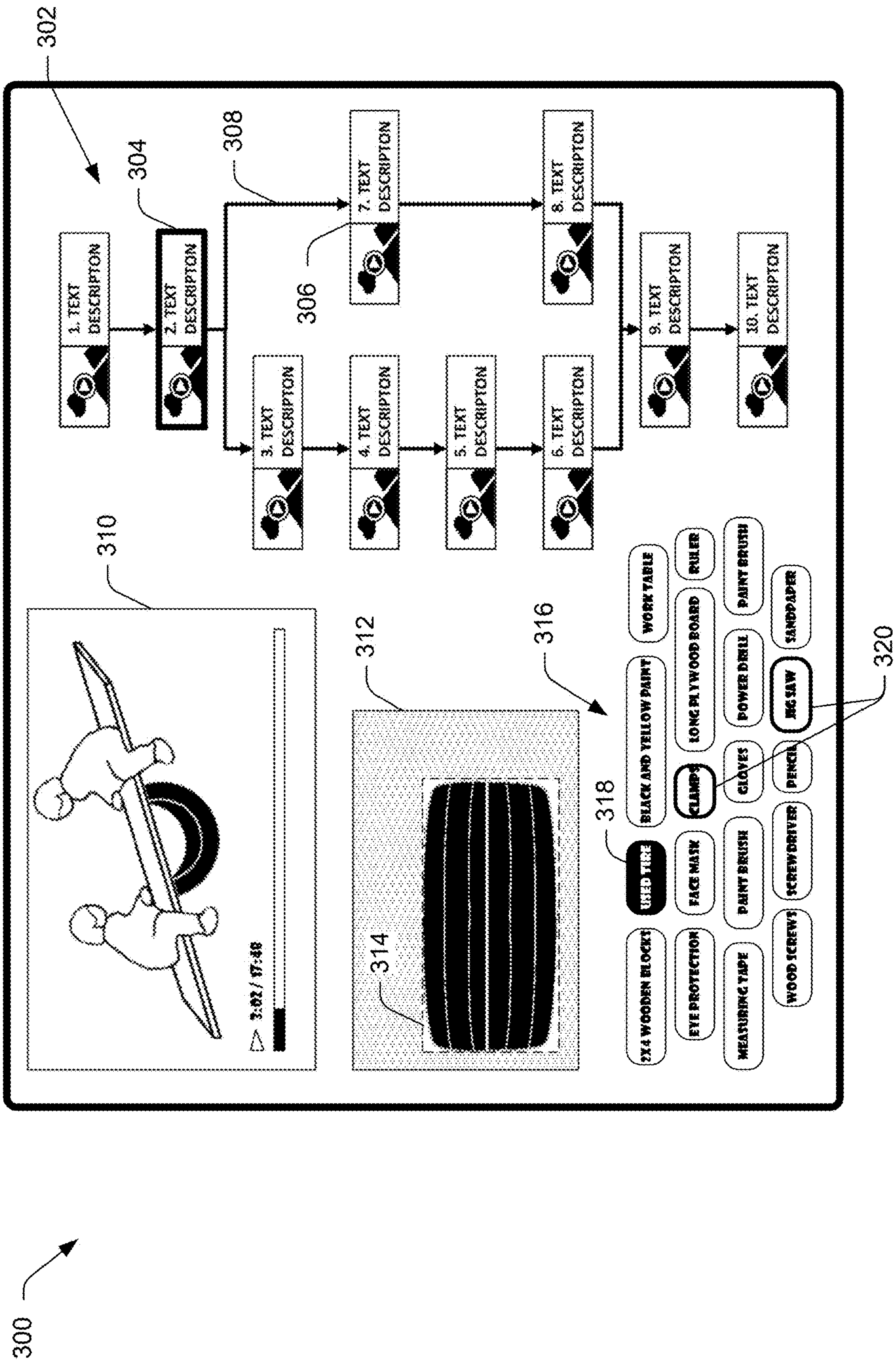
FIG. 3 illustrates an example user interface that presents a graph-based representation of tutorial content of a mixed-media tutorial.

FIG. 3 illustrates an example user interface 300 that presents a graph-based representation of tutorial content of a mixed-media tutorial. The user interface 300 is an example of the user interface 110 depicted in FIG. 1. In at least one aspect, the tutorial creation module 116 outputs the user interface 300 for display at the display device 112 to present the graph-based representation 126 of the graph-based data structure 124. For example, the user interface module 216 communicates with the display device 112 to cause the user interface 300 to be output for display from the computing device 102.

A user interacts with the user interface 300 to consume information from the graph-based representation 126 and learn how to perform a task. For example, the user interface module 216 outputs the user interface 300 to have multiple graphical elements. When the computing device 102 receives user inputs to select one or more of these graphical elements, different aspects of the tutorial content 122 embedded within the graph-based representation 126 are surfaced within the user interface 300 to aid in understanding how to perform a task. In one or more aspects, the user interface 300 is controlled by the user interface module 216 to present information from the graph-based data structure 124 that is related to a selected graphical element. Information about objects, procedural steps, and dependencies are highlighted in the user interface 300 in response to user inputs that select graphical elements corresponding to the objects, procedural steps, and dependencies.

In the illustrated example, multiple graphical elements of the user interface 300 are arranged into a dependency diagram 302. Some of the graphical elements of the dependency diagram 302 represent nodes of the graph-based data structure 124 and other graphical elements of the dependency diagram 302 represent edges between the nodes. A graphical element 304 of the dependency diagram 302 represents a first step node of the graph-based data structure 124 and a graphical element 306 represents a second step node of the graph-based data structure 124. The graphical element 304 and the graphical element 306 display respective step descriptions adjacent to respective step thumbnails. The step thumbnails are derivable from respective video segments where procedural steps corresponding to the first and second nodes are taught in a video tutorial included in the tutorial content 122. The step descriptions inferable based on corresponding sections of a transcript of the video tutorial. A third graphical element 308 of the dependency diagram 302 corresponds to an edge of the graph-based data structure 124 to indicate a dependency between the procedural steps that correspond to the first and second step nodes.

To the left of the dependency diagram 302, the user interface 300 includes a graphical element 310 to provide a video player for viewing the video tutorial included in the tutorial content 122. In at least one aspect, a user input that selects the graphical element 304 causes the video player provided in the graphical element 310 to play (e.g., linearly) the respective video segment of the procedural step corresponding to the first node. This user input also causes the user interface module 216 to highlight the graphical element 304 in the presentation of the user interface 300. Likewise, a user input detected at the graphical element 306 causes the user interface 300 to highlight the graphical element 306 and cause the video player to play the respective video segment of the procedural step corresponding to the second node.

A graphical element 312 of the user interface 300 is arranged below the graphical element 310 to preview an object bounding box 314 that encompasses an object image extracted from a video frame of the video tutorial. Beneath the graphical element 312, the user interface 300 includes a graphical element 316 showing a collection or list of objects that correspond to object nodes of the graph-based data structure 124. A graphical element 318 corresponds to an object corresponding to a first object node (e.g., a used tire) and graphical elements 320 correspond to others object that correspond to second object nodes, e.g., a set of clamps and a jig saw. The graphical elements of the list of objects represent object nodes of the graph-based data structure 124.

In at least one aspect, assume the object corresponding to the graphical element 318 shares a dependency in the graph-based data structure 124 with the procedural step associated with the step node linked to the graphical element 304. A user input that selects the graphical element 318 causes the graphical element 310 to preview the object bounding box 314 encompassing an object image of the object of the graphical element 318. This user input also causes the user interface 300 to highlight the graphical element 304. Likewise, the user input detected at the graphical element 318 causes the user interface 300 to highlight the graphical elements 320 because the object of the graphical element 318 and/or the procedural step of the graphical element 304 shares a dependency with each of the objects of the graphical elements 320. In this way, the graph-based representation 126 of the tutorial content 122 is consumable from the user interface 300 in both a linear and a non-linear fashion. A user is able to move within the user interface 300 to select graphical elements associated with objects and see related dependencies and/or nodes of the dependency diagram 302.

In the illustrated example, a user input that selects the graphical element 304 also causes the graphical element 318 and the graphical elements 320 to be highlighted in the user interface 300 to indicate the objects used to perform the procedural step corresponding to the first node. In this way, a user input received via the user interface 300 to select any of the graphical elements 304, 306, 308, 310, 316, 318, and 320, or the object bounding box 314, causes the user interface 300 to present information (e.g., a highlighting, text, image, etc.) associated with related portions of the graph-based data structure 124 (e.g., nodes or edges that share dependencies with the selected element).

Figure 4:
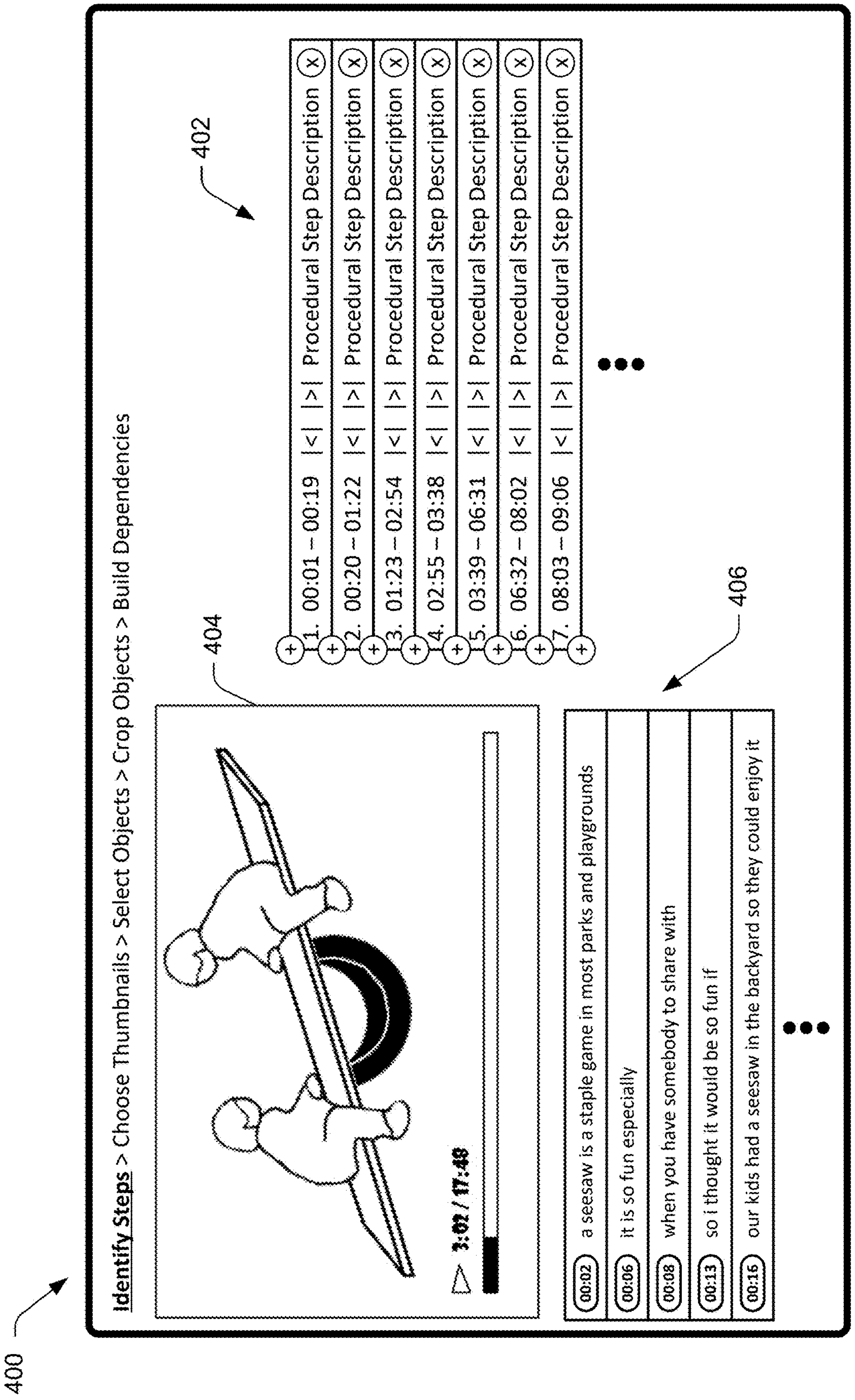
FIG. 4 illustrates an example user interface for revising procedural steps automatically extracted from tutorial content using machine-learning.

FIG. 4 illustrates an example user interface 400 for revising procedural steps automatically extracted from tutorial content using machine-learning. The user interface 400 represents a first stage of an authoring process implemented by the tutorial creation module 116 to generate the graph-based data structure 124. Specifically, the user interface 400 enables modification to the step descriptions and step timestamps assigned to each procedural step (e.g., each step node) contained in the graph-based data structure 124. The user interface 400 further enables modification to the dependencies 212 between the step nodes of the graph-based data structure 124 by allowing user inputs to cause a reordering of the procedural steps.

The user interface 400 includes a graphical element 402 that includes an ordered list of procedural steps associated with step nodes of the graphical-based data structure 124. For each step node in the graphical-based data structure 124, the graphical element 402 includes a respective step timestamp indicating where in a video tutorial of the tutorial content 122 that particular procedural step is conveyed, as well as a respective step description based on portions of a video transcript derived from the tutorial video. A user input at the graphical element 402 allows editing of an order of the procedural steps, the step descriptions, and/or the step timestamps. This way, the user has control over the data automatically populated in the graph-based structure 124 using machine-learning.

The user interface 400 also includes a graphical element 404 and a graphical element 406. The graphical elements 402, 404, and 406 are linked together (e.g., with shared attributes of the graph-based data structure 124), such that user inputs at one of the graphical elements 402, 404, and 406 adjusts information presented in the other graphical elements. The graphical elements 402, 404, and 406 allow a user an opportunity to correct information extracted from the tutorial content 122 using machine-learning, for instance, to add a new procedural step, delete a procedural step, and modify or revise an order or the step descriptions of one or more of the procedural steps.

In one or more aspects, selecting the graphical element 406 causes a highlight in the user interface 400 to a portion of the graphical element 402. This way the user is able to seamlessly navigate between the procedural steps identified in the graphical element 402 and the transcript portions and timestamps indicated in the graphical element 406. Likewise, the video player in the graphical element 404 adjust the video playback to correspond to the timestamp of the procedural step or the transcript portion selected based on the user input to the graphical element 402 or 406.

Figure 5:
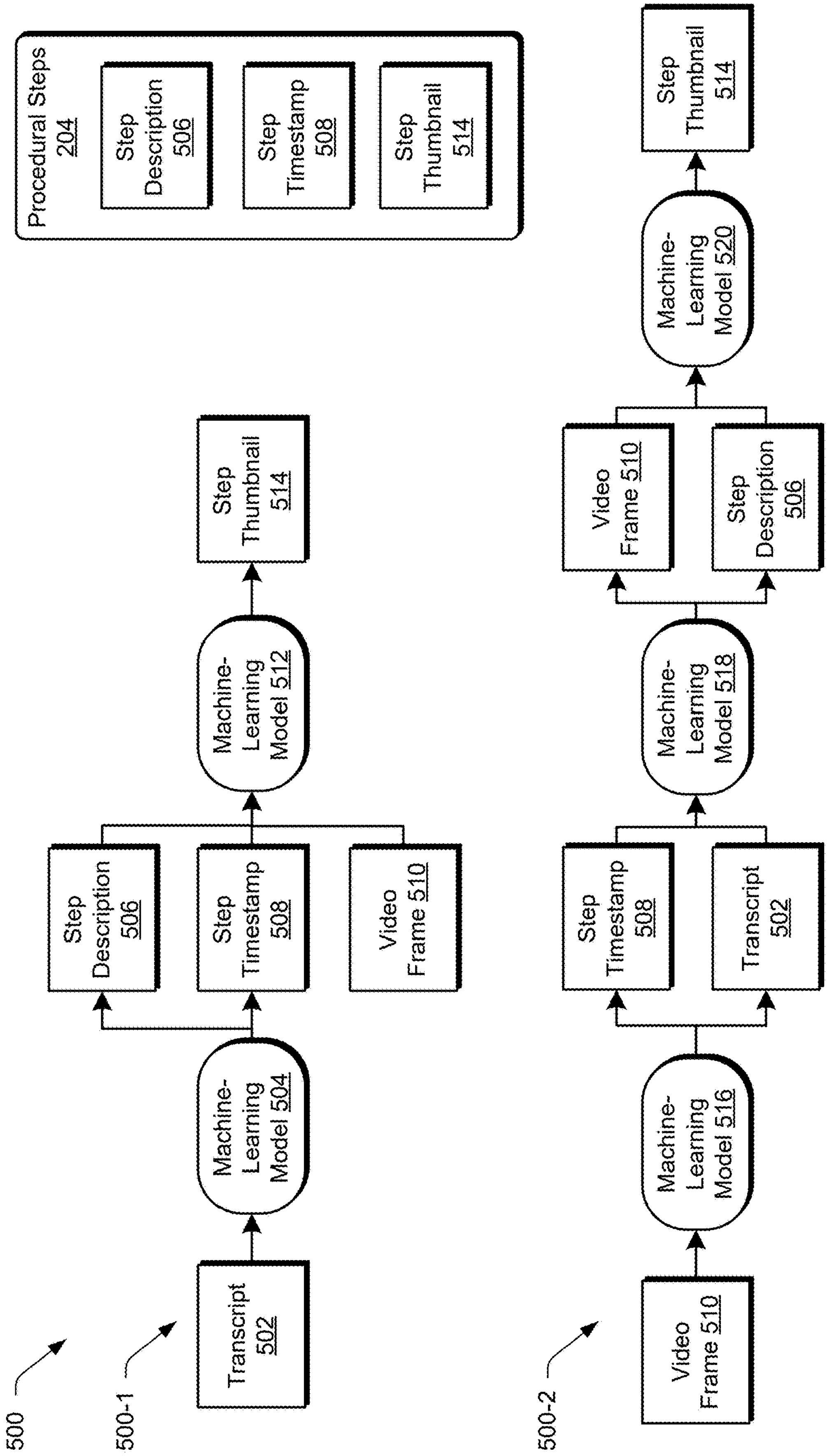
FIG. 5 illustrates examples of machine-learning pipelines of a step-extraction module of the tutorial creation module depicted in FIG. 2

FIG. 5 illustrates examples of machine-learning pipelines 500 of a step-extraction module of the tutorial creation module depicted in FIG. 2. A machine-learning pipeline 500-1 and a machine-learning pipeline 500-2 are different ways to configure the step-extraction module 202 for determining the procedural steps 204, however, these are but two of the many other machine-learning pipeline designs that are usable to configure of the step-extraction module 202 this way. At least some of the machine-learning pipelines described herein are designed for a specific use case or computing environment (e.g., operating system, processing technology, hardware architecture) based on performance of the computing device 102 in which the machine-learning pipelines are executed. Different machine-learning pipelines produce different types of errors. For example, different sequencings of the machine-learned models within each machine-learning pipeline cause differing results. If a noisy machine-learning model is used at the start of a machine-learning pipeline, frequent errors in the data propagate through the pipeline such that when last machine-learning model processes the data, results output from the machine-learning pipeline are incomplete or inaccurate. In general, each of the machine-learning pipelines 500-1 and 500-2 includes at least one machine-learning model that is trained to identify each of the plurality of procedural steps 204 from a video tutorial obtained from the tutorial content 122 by extracting a respective step description, a respective step timestamp, and a respective step thumbnail from a video transcript and a plurality of video frames of the video tutorial.

Consider the machine-learning pipeline 500-1, which includes two machine-learning models. A first machine-learning model 504 is configured to summarize steps from a transcript 502 received as input to the machine-learning pipeline 500-1. In one or more aspects, the transcript 502 is included in the tutorial content 122. In other examples, the transcript is embedded in a video tutorial (e.g., metadata, captioning data) included in the tutorial content 122. The transcript 502 includes text of spoken audio extracted from the video tutorial. The machine-learning model 504 is trained using machine-learning to summarize the transcript 502 into a series of procedural steps. The machine-learning module 504 outputs a step description 506 and a step timestamp 508 (e.g., beginning and ending time during the video tutorial) for each of the procedural steps 204 identified from the transcript 502. In one or more examples, the machine-learning model 504 is a large language model and in some cases receives a prompt (e.g., "Summarize the video transcript in several steps and include a start and end time for each step") as an additional input with the transcript 502. The prompt, in at least one aspect, is a zero-shot prompt because the task requested from the large language model is described directly. Few-shot prompting and prompt chaining are other techniques for prompting a large language model and are used in other variations.

A second machine-learning model 512 of the machine-learning pipeline 500-1 is configured as a shot boundary detector. For example, the machine-learning model 512 receives, as two inputs, the step description 506 and the step timestamp 508 of each of the procedural steps 204 summarized by the machine-learning model 504 and receives each video frame 510 of the video tutorial as a third input. The machine-learning model 512 is trained to determine the video frame 510 that is to be used as a step thumbnail 514 to represent each of the procedural steps 204. For example, the machine-learning model 512 infers a focused and representative video frame associated with a segment of the video tutorial that is associated with the step timestamp 508 and output that video frame as the step thumbnail 514 for that procedural step.

Next, consider the machine-learning pipeline 500-2, which includes three different machine-learning models. A first machine-learning module 516 of the machine-learning pipeline 500-2 is trained using machine-learning as a shot boundary detector, which is different than the shot boundary detector implemented using the machine-learning module 512. The machine-learning model 516 receives each video frame 510 of a video tutorial and outputs the step timestamp 508 of each of the procedural steps 204 inferred from the video tutorial as well the transcript 502. A second machine-learning model 518 is trained using machine-learning to be a text summarization model that outputs the step description 506 of each of the procedural steps 204. Each step description 506 is inferred by the machine-learning model 518 based on inputs that include the transcript 502 and each step timestamp 508 output from the machine-learning model 516. A third machine-learning model 520 of the machine-learning pipeline 500-2 is trained using machine-learning to operate another shot detector that outputs each step thumbnail 514 of the procedural steps 204. Each step thumbnail 514 is inferred by the machine-learning model 520 based on inputs that include each video frame 510 and each step description 506, which is then output from the machine-learning pipeline 500-2. In this way, each of the procedural steps 204 that is generated by the step-extraction module 202 has at least three attributes, the step description 506, the step timestamp 508, and the step thumbnail 514.

Figure 6:
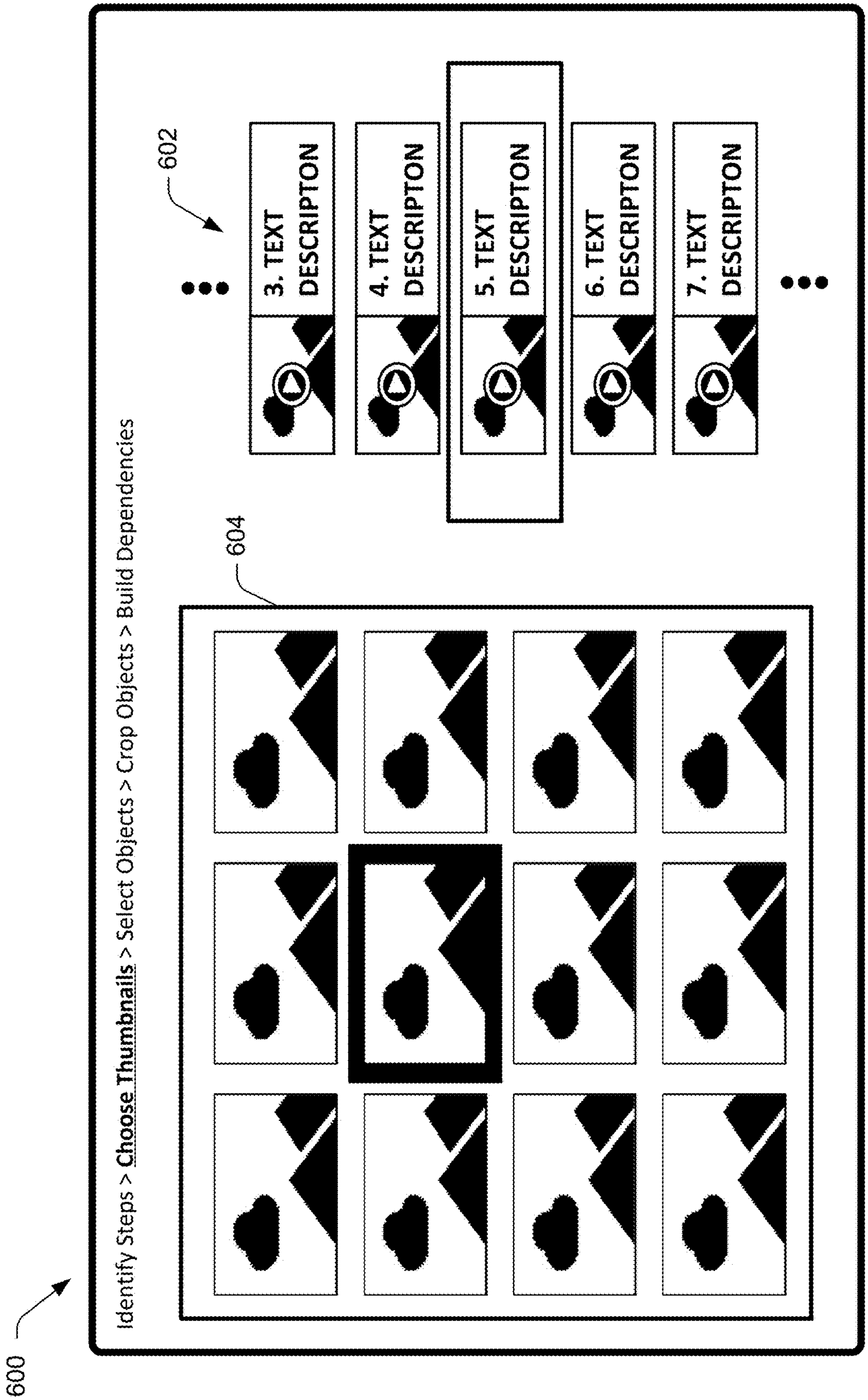
FIG. 6 illustrates an example user interface for revising procedural steps automatically extracted from tutorial content using machine-learning.

FIG. 6 illustrates an example user interface 600 for revising procedural steps automatically extracted from tutorial content using machine-learning. The user interface 600 represents a second stage of the authoring process implemented by the tutorial creation module 116 to generate the graph-based data structure 124. Specifically, the user interface 600 enables modification to the step thumbnail assigned to each procedural step (e.g., each step node) contained in the graph-based data structure 124.

The user interface 600 includes a graphical element 602 that includes an ordered list of procedural steps associated with step nodes of the graphical-based data structure 124. For each step node in the graphical-based data structure 124, the graphical element 602 includes a respective step thumbnail and step description. A user input at the graphical element 602 allows selection of a particular procedural step.

The user interface 600 also includes a graphical element 604. Within the graphical element 604, multiple thumbnail options for representing the selected step in the graphical element 602 are presented in the user interface 600. User inputs at the graphical element 604 allow the user to choose a desired thumbnail image to represent the procedural step selected in the graphical element 602. For example, a user input detected at the user interface 600 highlights a fifth step in the list of steps. With the fifth step highlighted, the graphical element 604 is updated to include several possible thumbnail images extracted from a video segment associated with the fifth step. In the illustrated example, a thumbnail in the second row from the top and middle column is selected by a user input to the user interface 600. The thumbnail is stored in the step node of the graph-based data structure associated with that procedural step, including to replace a previous thumbnail selected using machine-learning. In this way, the user has control over the data automatically populated in the graph-based structure 124 using machine-learning.

Figure 7:
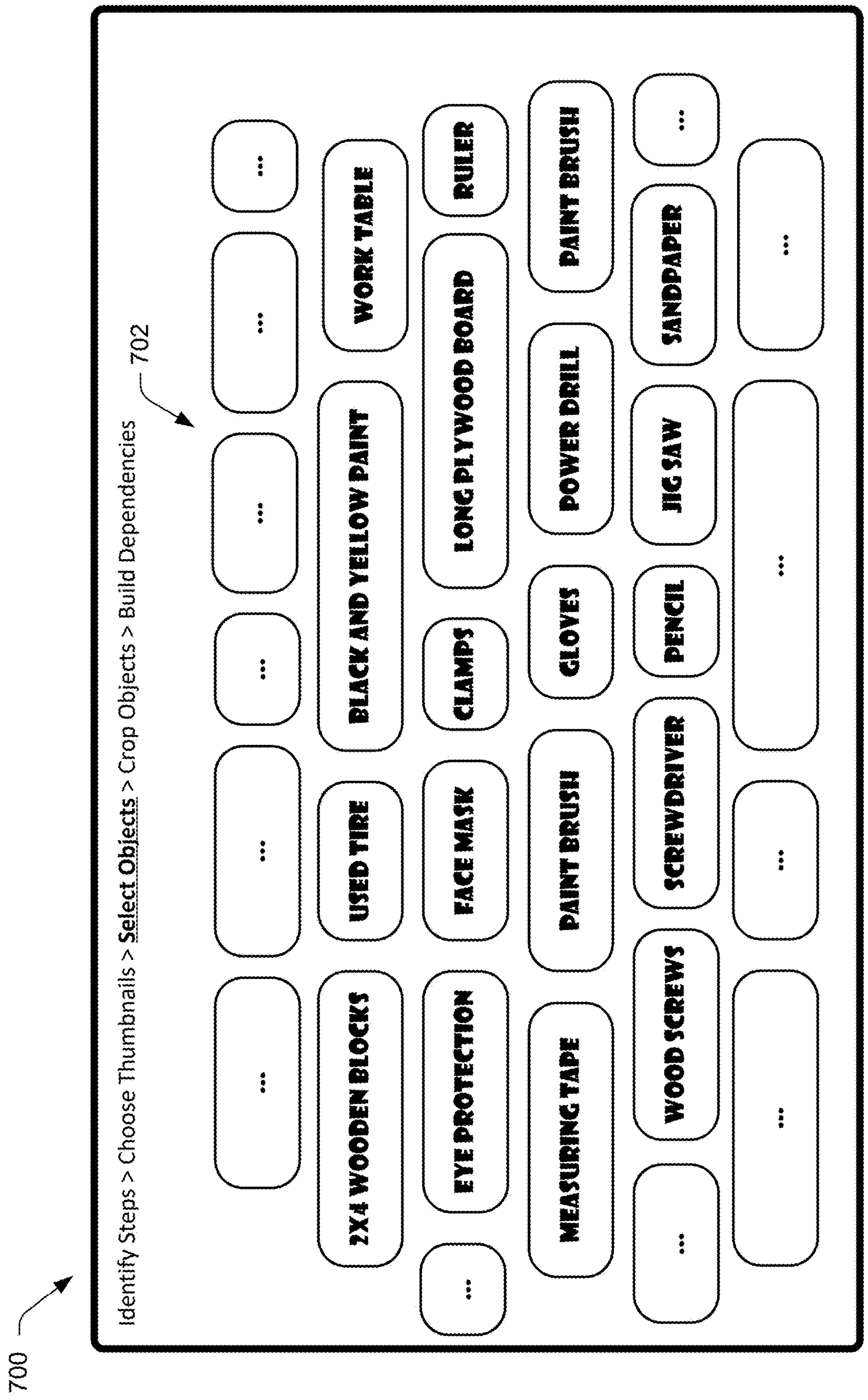
FIGS. 7 and 8 illustrate example user interfaces for revising objects automatically extracted from tutorial content using machine-learning.
Figure 8:
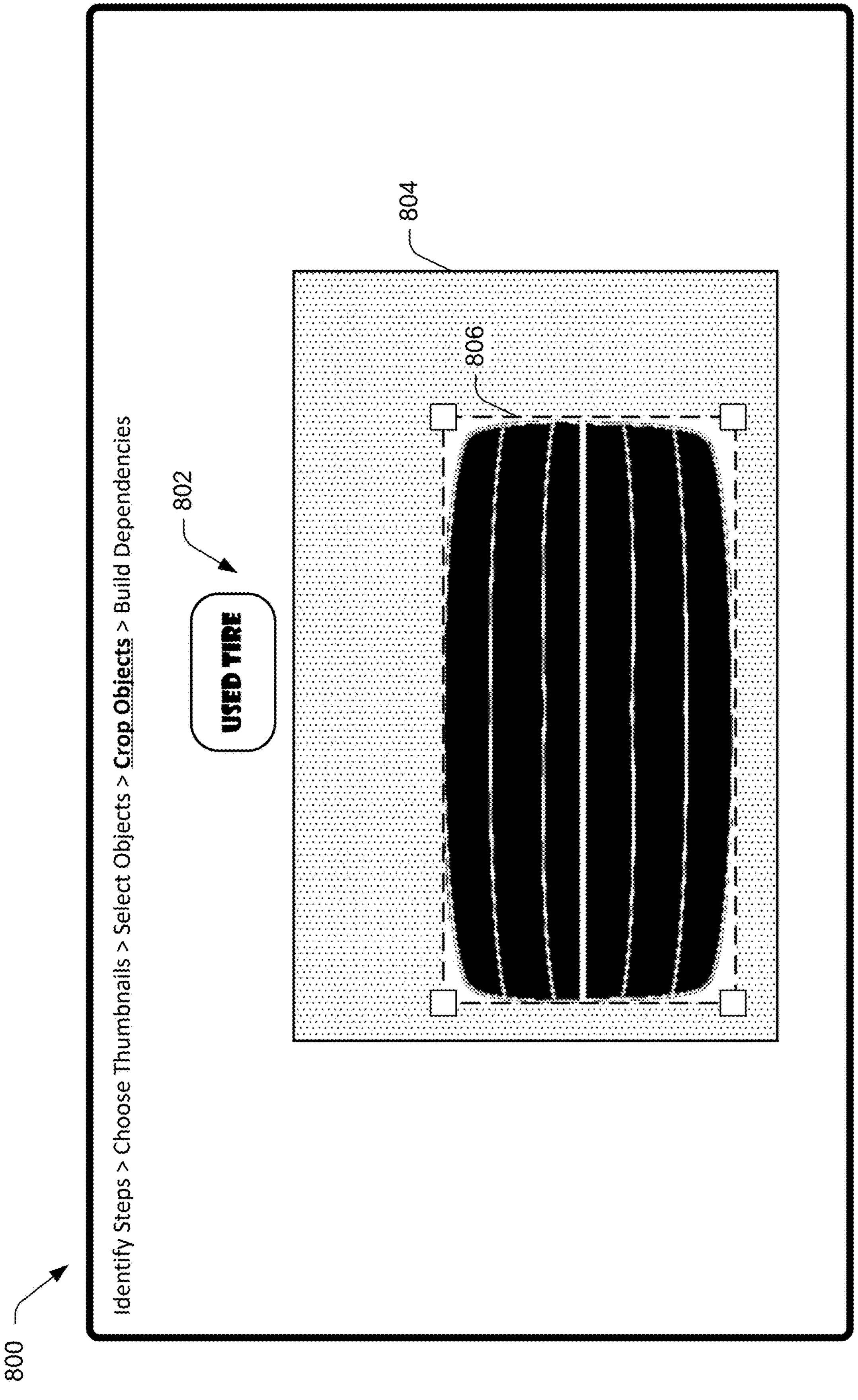

FIGS. 7 and 8 illustrate example user interfaces 700 and 800, respectively, for revising objects automatically extracted from tutorial content using machine-learning. Turning first to FIG. 7, the user interface 700 represents a third stage of the authoring process implemented by the tutorial creation module 116 to generate the graph-based data structure 124. Specifically, the user interface 700 enables modification to the objects contained in object nodes of the graph-based data structure 124.

A graphical element 702 includes a list or collection of objects extracted using machine-learning and populated in the graph-based data structure 124 as object nodes. At this stage of the authoring process, the tutorial creation module 116 allows users to add, remove, or modify the objects utilized in the mixed-media tutorial 118. For example, selection of an object within the graphical element 702 causes the tutorial creation module 116 to make parameters of an object node in the graph-based data structure 124 to be editable. A user provides inputs to change an object name or remove the object from the graph-based data structure, e.g., remove a corresponding object node.

Next, with reference to FIG. 8, the user interface 800 represents a fourth stage of the authoring process implemented by the tutorial creation module 116 to generate the graph-based data structure 124. Specifically, the user interface 800 enables further modification to attributes of the objects contained in object nodes of the graph-based data structure 124.

As one example, the user interface 800 includes a graphical element 802 that presents an object name (e.g., used tire) of one of the objects associated with an object node from the graph-based data structure 124. A graphical element 804 represents an image of the object from a video frame extracted in the video tutorial of the tutorial content 122, with a bounding box 806 drawn around the object such that the background of the image is blurred, masked, and/or cropped from the object image that is stored in the graphical-based data structure at the corresponding object node. The bounding box 806 includes handles to allow user inputs to adjust the size and shape of the bounding box 806 and improve the information automatically generated using machine-learning. In this way, the tutorial creation module 116 controls the user interface 700 to enable modifications to respective object names of objects represented by object nodes of the graph-based data structure 124. The user interface 800 is provided by the tutorial creation module 116 to enable modifications to respective object images and respective object bounding boxes of objects represented by object nodes of the graph-based data structure 124.

Figure 9:
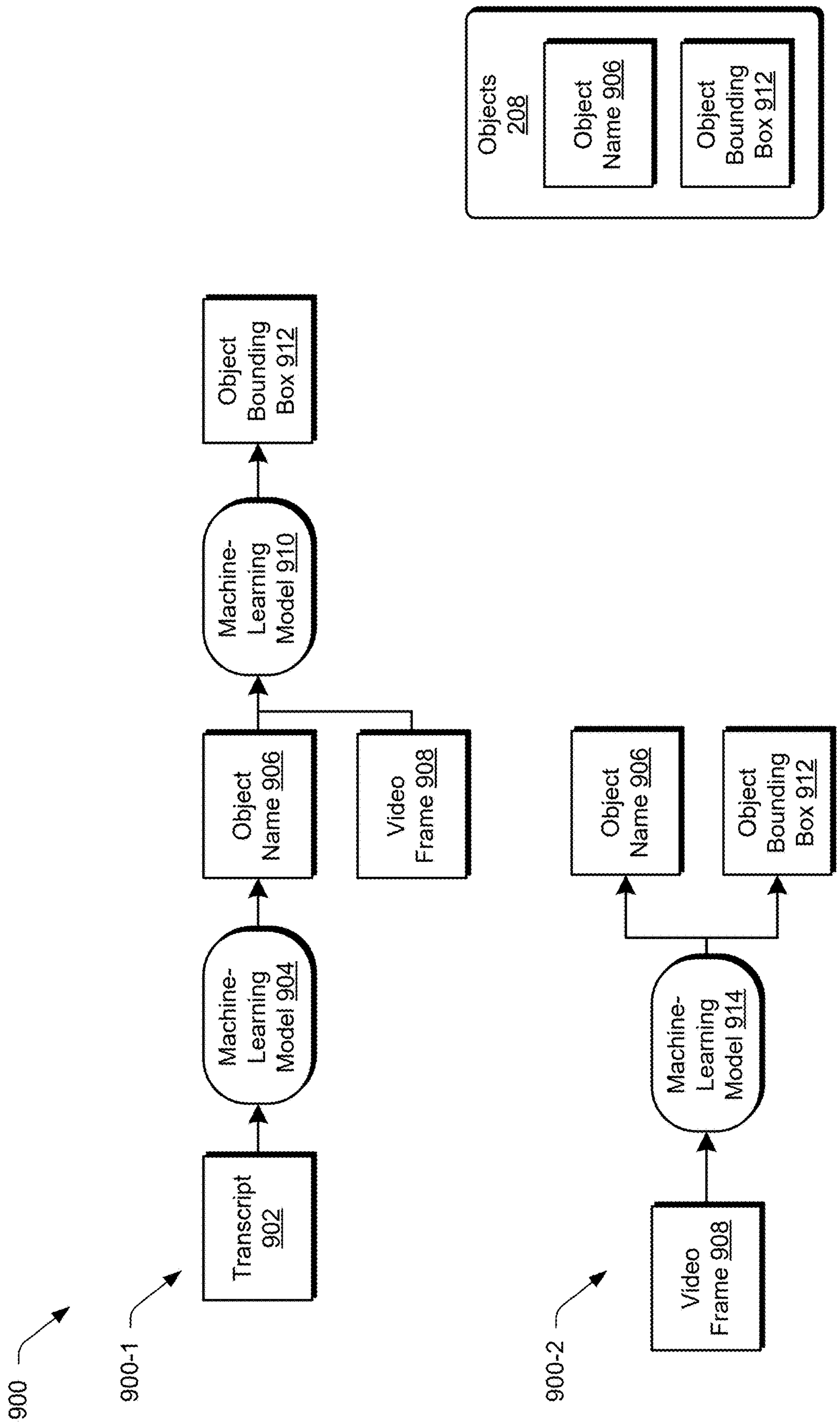
FIG. 9 illustrates examples of machine-learning pipelines of an object-extraction module of the tutorial creation module depicted in FIG. 2

FIG. 9 illustrates examples of machine-learning pipelines 900 of an object-extraction module of the tutorial creation module depicted in FIG. 2. A machine-learning pipeline 900-1 and a machine-learning pipeline 900-2 are different ways to configure the object-extraction module 206 for determining the objects 208, however, these are but two of the many other machine-learning pipeline designs that are usable to configure of the object-extraction module 206 this way. In general, each of the machine-learning pipelines 900-1 and 900-2 includes at least one machine-learning model that is trained to identify each of the plurality of objects 208 from the video tutorial by extracting a respective object name and a respective object bounding box from the video transcript and the plurality of video frames.

In the illustrated example, turn first to the machine-learning pipeline 900-1, which includes two machine-learning models. A first machine-learning model 904 is configured to summarize objects (e.g., materials, tools, items, ingredients) from a transcript 902 of a video tutorial or audio tutorial received as input to the machine-learning pipeline 900-1. In one or more aspects, the transcript 902 is included in the tutorial content 122. In other examples, the transcript 902 is embedded in a video tutorial or audio tutorial (e.g., metadata, captioning data) included in the tutorial content 122. The transcript 902, in one or more aspects, includes text of spoken audio extracted from the video tutorial. The machine-learning model 904 is trained using machine-learning to summarize the transcript 902 into a series of objects. The machine-learning module 904 outputs an object name 906 for each of the objects 208 identified from the transcript 902. In one or more examples, the machine-learning model 904 is a large language model and in some cases receives a prompt (e.g., "Find out what objects/ingredients/tools/materials/equipment are used in the tutorial") as an additional input with the transcript 902. The prompt, in at least one aspect, is a zero-shot prompt. In other examples, few-shot prompting or prompt chaining is used to prompt the machine-learning model 904.

A second machine-learning model 910 of the machine-learning pipeline 900-1 is configured as an object detector. For example, the machine-learning model 910 receives, as two inputs, the object name 906 output from the machine-learning model 904 and as well as each video frame 908 of the video tutorial from which the transcript 902 is derived as a second input. The machine-learning model 910 is trained to determine an object that is classified by the object name 906 in a corresponding video frame 908. A bounding box 912 surrounding the object in that video frame 908 is output from the machine-learning model 910 to represent each of the objects 208. For example, the machine-learning model 910 infers a focused and representative video frame 908 that has a highest score for containing the object and output the bounding box 912 surrounding the object in a portion of that video frame for each of the objects 208.

Next, consider the machine-learning pipeline 900-2, which includes a single machine-learning model. A machine-learning module 914 of the machine-learning pipeline 900-2 is trained using machine-learning as object classifier and detector, which is different than the object detector implemented using the machine-learning model 910. The machine-learning model 914 receives each video frame 908 of a video tutorial and outputs the object name 906 of each of the objects 208 inferred from the video tutorial as well the object bounding box 912 that corresponds to each of the objects 208. In this way, each of the objects 208 that is generated by the object-extraction module 206 has at least two attributes, the object name 906 and the object bounding box 912.

Figure 10:
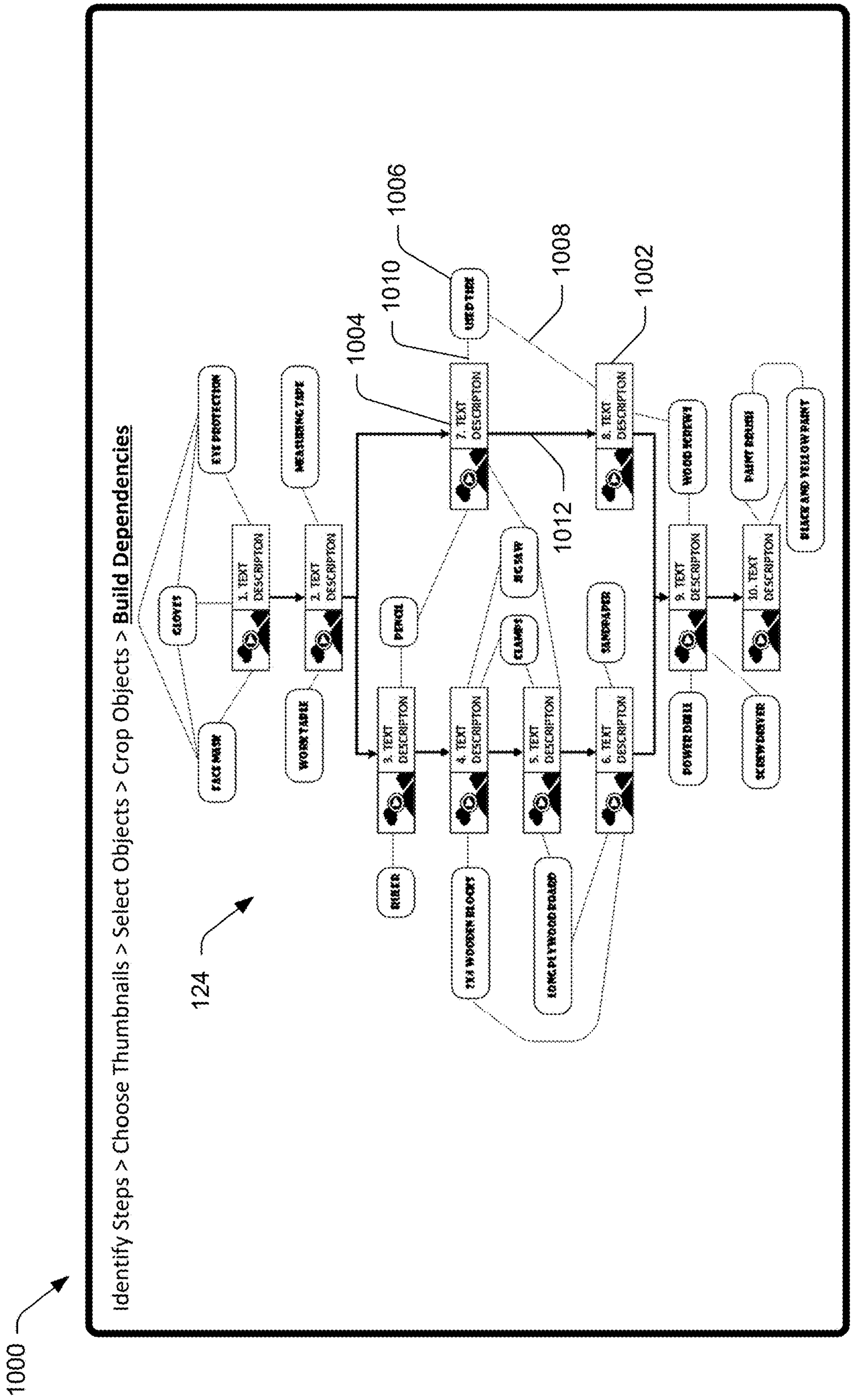
FIG. 10 illustrates an example user interface for revising dependencies determined between procedural steps and objects automatically extracted from tutorial content using machine-learning.

FIG. 10 illustrates an example user interface 1000 for revising dependencies determined between procedural steps and objects automatically extracted from tutorial content using machine-learning. The user interface 1000 represents a fifth stage of the authoring process implemented by the tutorial creation module 116 to generate the graph-based data structure 124. Specifically, the user interface 1000 enables modification to the dependencies contained between the object nodes and the procedural steps of the graph-based data structure 124. In one or more aspects, the graph-based data structure 124 stores information about the object nodes, the step nodes, and the edge dependencies, as complex, nested JSON objects defined by source code. Inputs to the user interfaces 300, 400, 600, 700, 800, and 1000 enable edits to the JSON objects based on user inputs to these user interfaces.

In the user interface 1000, a step node 1002 and a step node 1004 share a same object node 1006 and are therefore each connected by a dependency edge 1008 and a dependency edge 1010, respectively, with the object node 1006. A dependency edge 1012 connects the step node 1002 to the step node 1004 to indicate a temporal dependency (e.g., an order of operations) associated with performing the respective procedural steps of the step node 1002 and the step node 1004.

Users can also create new dependencies, delete dependencies, and modify dependencies. For example, if the authoring user deems that the step node 1002 is mistakenly linked via the dependency edge 1008 (e.g., the object of the object node 1006 is not used in performing the procedural step associated with the step node 1002), inputs to select the dependency edge 1008 enable removal of this dependency. Likewise, user inputs at the user interface 1000 are usable to move a dependency, e.g., move the dependency edge 1010 to a different step node. In addition, the user inputs at the user interface 1000 are interpretable by the tutorial creation module 116 to add a new dependency edge, e.g., between two step nodes, two object nodes, or a step node and object node.

Figure 11:
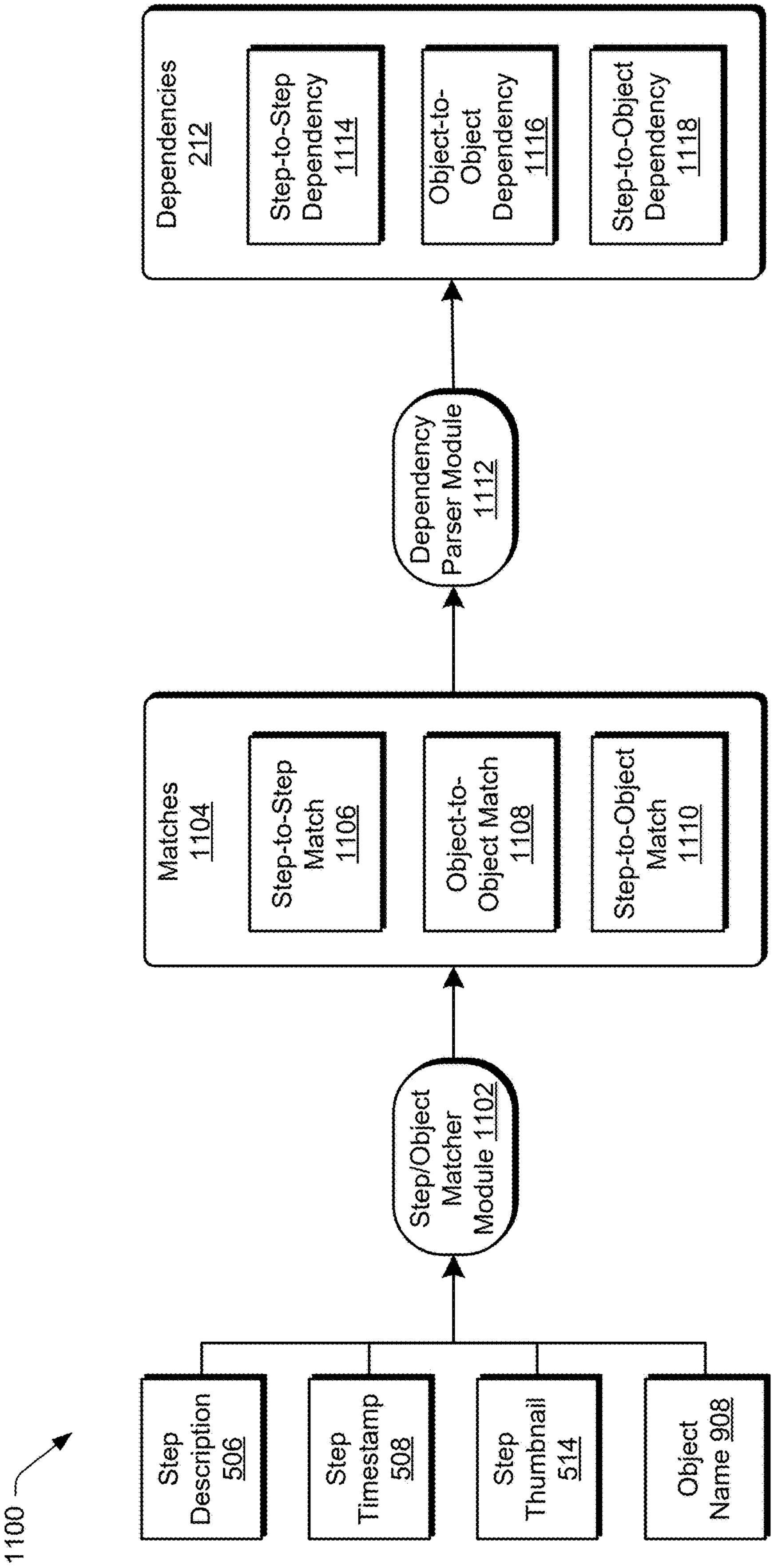
FIG. 11 illustrates an example of a processing pipeline of a dependency module of the tutorial creation module depicted in FIG. 2

FIG. 11 illustrates an example of a processing pipeline 1100 of a dependency module of the tutorial creation module depicted in FIG. 2. The processing pipeline 1100 is one way to configure the dependency module 210 for determining the dependencies 212. The processing pipeline 1100 is one of the many other processing pipeline designs that are usable to configure of the dependency module 210 this way. In general, the processing pipeline 1100 is configured to identify each of the plurality of dependencies 212 from the video tutorial based on an input of the procedural steps 204 and the objects 208.

The processing pipeline 1100 includes a step/object matcher module 1102 configured to determine similarities or a match between the procedural steps 204 and/or the objects 208. For example, the step/object matcher module 1102 receives the step description 506, the step timestamp 508, and the step thumbnail 514 of each of the procedural steps 204 as input. In addition, the step/object matcher module 1102 receives the object name 906 of each of the objects 208 as additional input.

The step/object matcher module 1102 compares the step timestamp 508 of two of the procedural steps 204 to determine a temporal order of the procedural steps 204. In response to determining that the step timestamp 508 of one of the procedural steps 204 precedes or follows the step timestamp 508 of another of the procedural steps 204, a step-to-step match 1106 is output among various matches 1104 identified by the step/object matcher module 1102.

Another way the step/object matcher module 1102 determines a step-to-step match 1106 is by comparing the step description 506 of two of the procedural steps 204 to determine related portions of the step description 506 of the procedural steps 204. In response to determining that at least a portion of the step description 506 of one of the procedural steps 204 is related (e.g., textually) to at least a portion of the step description 506 of another of the procedural steps 204, a step-to-step match 1106 is output among various matches 1104 identified by the step/object matcher module 1102.

In addition, the step/object matcher module 1102 compares the object name 906 of two of the objects 208 to determine whether the objects 208 are related. For example, if one of the objects 208 has an object name 906 that is "screwdriver" and another of the objects 208 has an object name 906 that is "wood screw" then the step/object matcher module 1102 determines there is an object-to-object match 1108 and is output among various matches 1104 identified by the step/object matcher module 1102.

In addition, the step/object matcher module 1102 compares the step description 506 to the object name 906 to determine portions of the step description 506 that reference or do not reference the object name 906. In response to determining that the object name 906 of one or more of the objects 208 is mentioned in the step description of one or more of the procedural steps 204, a step-to-object match 1108 is output among various matches 1104 identified by the step/object matcher module 1102. dependency between a procedural step and an object based on the respective step description of the procedural step with the respective object name of the object.

The processing pipeline 1100 also includes a dependency parser module 1112 configured to determine the dependencies 212 as being either a step-to-step dependency 1114, an object-to-object dependency 1116, or a step-to-object dependency 1118. For example, the dependency parser module 1112 receives the matches 1104 output from the step/object matcher module 1102 as inputs. Based on the inputs, the dependency parser module 1112 determines the dependencies 212.

As one example, for each step-to-step match 1106 determined, the dependency parser module 1112 identifies one of the dependencies 212 to be a dependency between a first of the procedural steps 204 and a second of the procedural steps 204 based on the step-to-step match 1106 determined between the two procedural steps 204. The step-to-step match 1106 being determined from a relationship between the step description 506 of the first procedural step and the step description 506 of the second procedural step or from a relationship between the step timestamp 508 of the first procedural step and the step timestamp 508 of the second procedural step.

In at least one aspect, for each object-to-object match 1108 determined, the dependency parser module 1112 identifies one of the dependencies 212 to be a dependency between a first of the objects 208 and a second of the objects 208 based on the object-to-object match 1108 determined between the object name 906 of the first object and the object name 906 of the second object.

Additionally, for each step-to-object match 1110 determined, the dependency parser module 1112 identifies one of the dependencies 212 to be a dependency between one of the procedural steps 204 and one of the objects 208 based on the step-to-object match 1110 determined between the step description 506 of the procedural step and the object name 906 of the object.

With the dependencies 212 determined, the graph generation module 214 assembles the objects 208 into a plurality of object nodes of the graph-based data structure 124, in addition to populating the procedural steps 204 within a plurality of step nodes of the graph-based data structure 124. The dependencies 212 are inserted as edges of the graph-based data structure 124 between the step nodes, between the object nodes, and between the step and object nodes, in one or more examples. For example, the graph generation module 214 creates an edge dependency in the graph-based data structure 124 between two step nodes based on the step-to-step dependency 1114 determined for the two corresponding procedural steps. An edge dependency in the graph-based data structure 124 is created by the graph generation module 214 between two object nodes based on the object-to-object dependency 1116 determined for the two corresponding objects. The graph generation module 214 creates an edge dependency in the graph-based data structure 124 between a step node and an object node based on the step-to-object dependency 1118 determined for a corresponding procedural step and a corresponding object.

Figure 12:
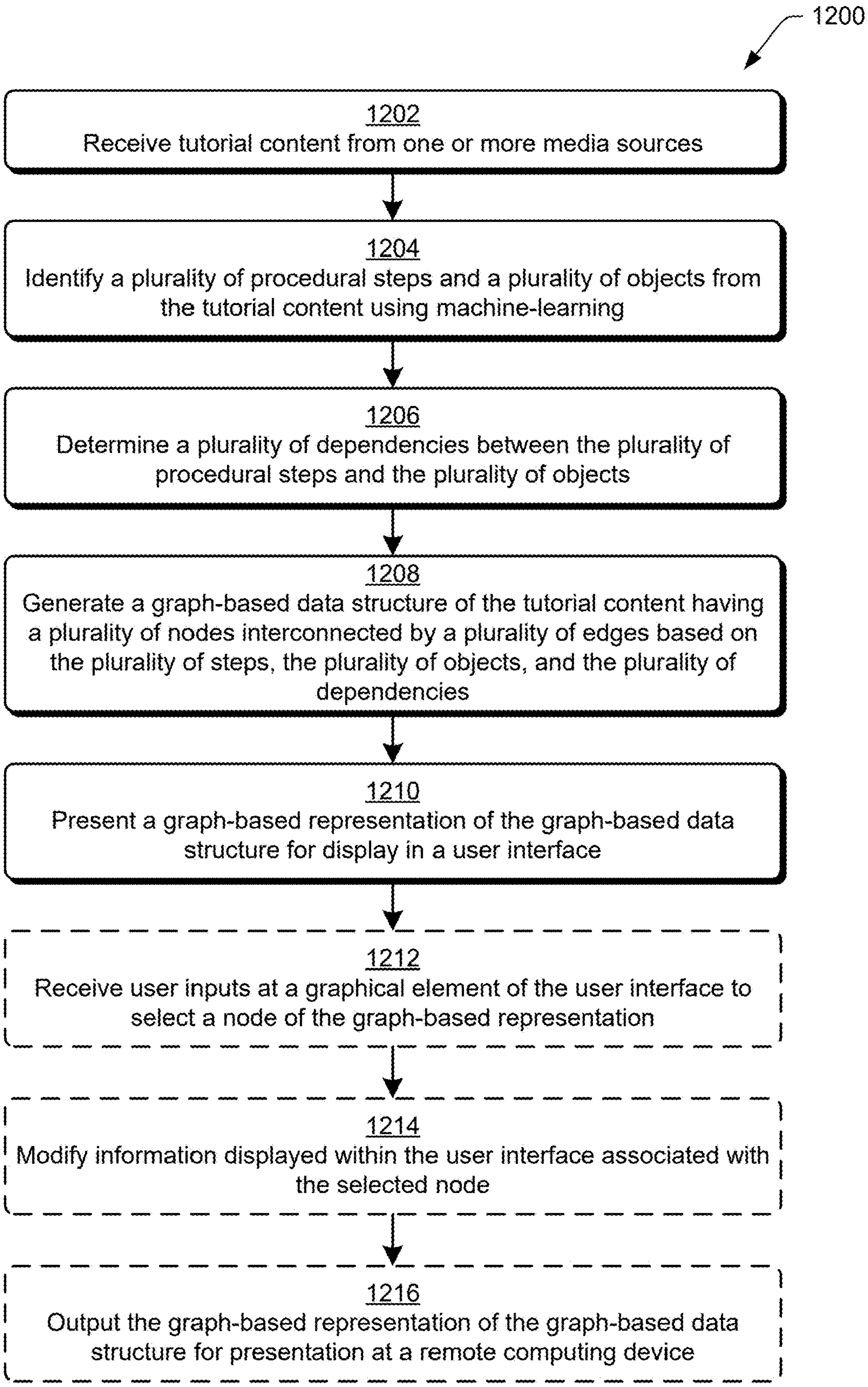
FIG. 12 is a flow diagram depicting an algorithm as a step-by-step procedure, which is performable by a processing device to perform collaborative mixed-media tutorial creation.

FIG. 12 is a flow diagram depicting an algorithm as a step-by-step procedure 1200, which is performable by a processing device to perform collaborative mixed-media tutorial creation. The procedure 1200 is executed by the tutorial creation module 116 to generate the mixed-media tutorial 118 from the tutorial content 122 using machine-learning in combination with user inputs.

At the start of the procedure 1200, tutorial content is received from one or more media sources (block 1202). The tutorial creation module 116 receives the input 120 including the tutorial content 122, which includes various types of media, such as video data, image data, audio data, text data, haptic-feedback data, diagram-data, or presentation data. The tutorial content 122 is received from various types of media sources, such as a video source, an image source, an audio source, a text source, a haptic-feedback source, a document source, and a presentation source.

After receiving the tutorial content, the procedure 1200 continues with a plurality of procedural steps and a plurality of objects being identified from the tutorial content using machine-learning (block 1204). In one example, the tutorial creation module 116 executes one or more machine-learning models that are trained to identify the procedural steps 204 from the tutorial content 122. The tutorial module 116 further executes one or more machine-learning models that are trained to identify the objects 208 from the tutorial content 122.

Next in the procedure 1200, a plurality of dependencies are determined between the plurality of procedural steps and the plurality of objects (block 1206). As one example, based on the procedural steps 204 and the objects 208 identified from the tutorial content 122, the tutorial creation module 116 determines the dependencies 212. Examples of the dependencies 212 include step-to-step dependencies that represent a temporal order for performing two of the procedural steps 204, object-to-object dependencies that represent a relationship between two or more of the objects 208, and step-to-object dependencies indicating one of the objects 208 that is used to perform one of the procedural steps 204.

Based on the plurality of steps, the plurality of objects, and the plurality of dependencies determined up to this point of the procedure 1200, a graph-based data structure of the tutorial content is generated having a plurality of nodes interconnected by a plurality of edges (block 1208). For example, the tutorial creation module 116 assigns each of the procedural steps 204 and each of the objects 208 to corresponding nodes of the graph-based data structure 124. The tutorial creation module 116 represents the dependencies 212 by inserting edges between the nodes of the graph-based data structure 124, which indicate relationships between the procedural steps 204 and the objects 208.

With the graph-based data structure generated, a graph-based representation of the graph-based data structure is presented for display in a user interface (block 1210). In one or more aspects, the tutorial creation module 116 causes the display device 112 to output the user interface 110 for display to show the graph-based representation 126. From the user interface, the graph-based representation 126 is editable and/or consumable.

Optionally, the procedure 1200 continues with user inputs being received at a graphical element of the user interface to select a node of the graph-based representation (block 1212). In at least one variation, a user of the computing device 102 that authors the mixed-media tutorial 118 provides user inputs to the computing device 102 to select a node of the graph-based representation 126.

As another optional step of the procedure 1200, information displayed within the user interface that is associated with the selected node is modified (block 1214). As one example, the user inputs cause the tutorial creation module 116 to edit a description of a procedural step or an object associated with the selected node. In this way, the authoring user is able to fine tune the graph-based representation 126 to improve aspects automatically generated by the machine-learning models employed to extract the procedural steps 204 and/or the objects 208.

In the illustrated example of FIG. 12, the procedure 1200 includes a final optional step where the graph-based representation of the graph-based data structure is output for presentation at a remote computing device (1216). For example, the tutorial creation module 116 outputs the graph-based data structure 124 embedded within the graph-based representation 126 as the mixed-media tutorial 118. The mixed-media tutorial 118 is a compact and sharable data package that is transmittable via the network 114 from the computing device 102 to one or more remote devices. The mixed-media tutorial 118 is a self-contained data package that is presentable in a user interface displayed on one or more of these remote devices. Rather than viewing a video tutorial or other type of media to learn a task, a user of a remote device that receives the mixed-media tutorial 118 is able to interact with the graph-based representation 126 to learn how to complete a task by following the procedural steps 204 in a linear or non-linear manner.

Example System and Device

Figure 13:
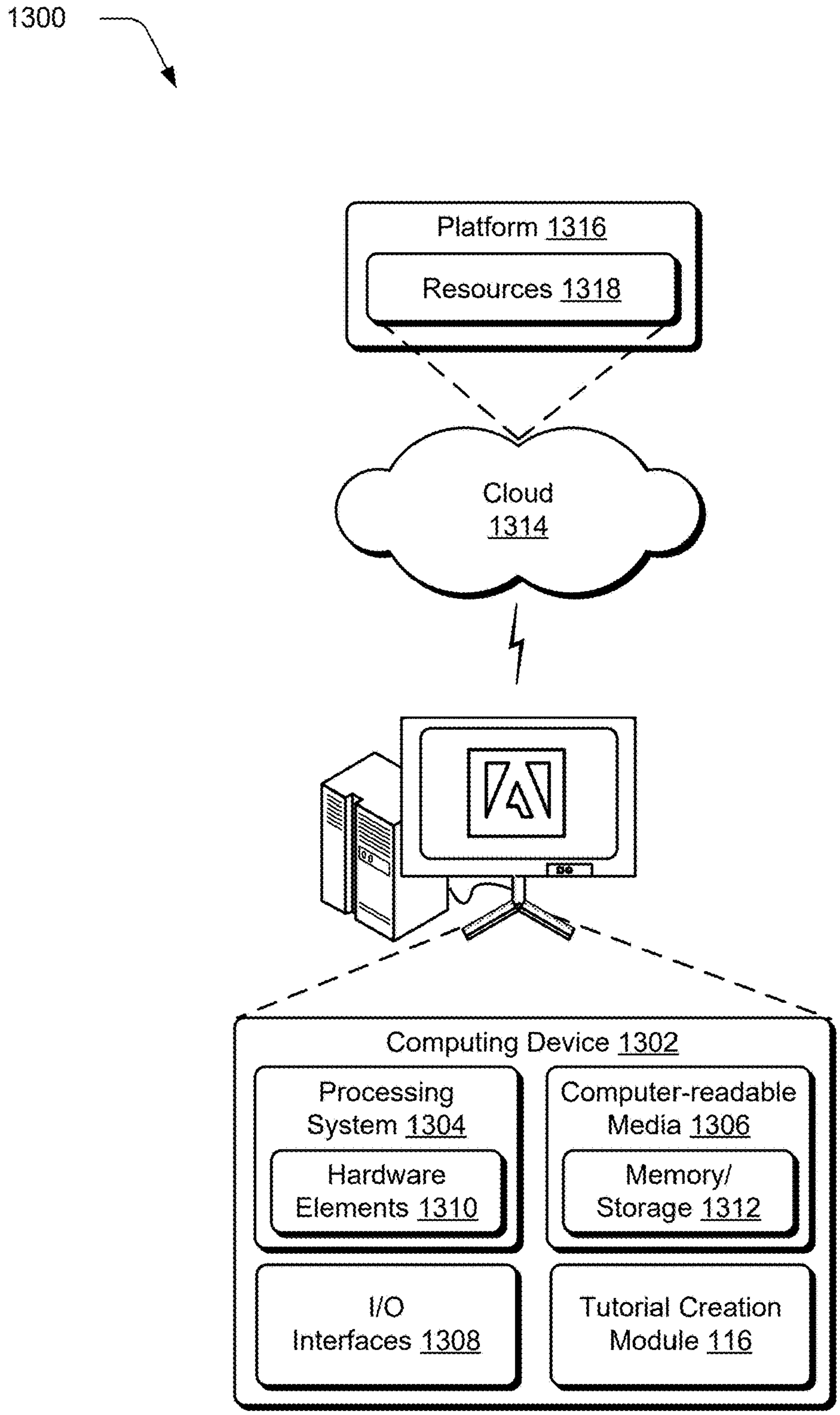
FIG. 13 illustrates an example system including various components of an example device that can be implemented as any type of computing device as described and/or utilized with reference to FIGS. 1-12 to implement examples of the techniques described herein.

FIG. 13 illustrates an example system including various components of an example device that can be implemented as any type of computing device as described and/or utilized with reference to FIGS. 1-12 to implement examples of the techniques described herein. FIG. 13 illustrates an example system 1300 generally, which includes an example computing device 1302 that is representative of one or more computing systems and/or devices that implement the various techniques described herein. This is illustrated through inclusion of the tutorial creation module 116. The computing device 1302 is configurable, for example, as a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including the hardware elements 1310, which are configurable as processors, functional blocks, and so forth. This includes implementation in hardware as an application specific integrated circuit or other logic device formed using one or more semiconductors. The hardware elements 1310 are not limited by the materials from which they are formed, or the processing mechanisms employed therein. For example, processors are configurable as semiconductor(s) and/or transistors (e.g., electronic integrated circuits (ICs)). In such a context, processor-executable instructions are electronically executable instructions.

The computer-readable media 1306 is storage media illustrated as including memory/storage 1312. The memory/storage 1312 represents memory/storage capacity associated with one or more computer-readable media. For example, the memory/storage 1312 is configured as a memory component configured to store the mixed-media tutorial 118 generated by the tutorial creation module 116 from the tutorial content 122 received as the input 120. The memory/storage 1312 includes volatile media (such as random access memory (RAM)) and/or nonvolatile media (such as read-only memory (ROM), Flash memory, optical disks, magnetic disks, and so forth). The memory/storage 1312 includes fixed media (e.g., RAM, ROM, a fixed hard drive, and so on) as well as removable media (e.g., Flash memory, a removable hard drive, an optical disc, and so forth). The computer-readable media 1306 is configurable in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, a haptic-feedback device, and so forth. Thus, the computing device 1302 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1302. By way of example, and not limitation, computer-readable media includes "computer-readable storage media" and "computer-readable signal media."

As used herein, the term "Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable, and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

Further, as used herein, the phrase "Computer-readable signal media" refers to a signal-bearing medium that is configured to transmit instructions to the hardware of the computing device 1302, such as via a network, e.g., the network 114. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that are employed in some examples to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously. For example, the hardware elements 1310 include a processing device coupled to the memory component implemented by the memory/storage 1312 to perform operations of the tutorial creation module 116. The operations, when executed, cause the processing device implemented by the hardware elements 1310 to generate the graph-based data structure 124 stored in the memory/storage 1312, including for producing the graph-based representation 126 that is presented for user consumption, e.g., in the user interface 110.

Combinations of the foregoing are also employed to implement various techniques described herein. Accordingly, software, hardware, or executable modules are implemented as one or more instructions and/or logic embodied on some form of computer-readable storage media and/or by one or more hardware elements 1310. The computing device 1302 is configured to implement particular instructions and/or functions corresponding to the software and/or hardware modules. Accordingly, implementation of a module that is executable by the computing device 1302 as software is achieved at least partially in hardware, e.g., through use of computer-readable storage media and/or hardware elements 1310 of the processing system 1304. The instructions and/or functions are executable/operable by one or more articles of manufacture (for example, at least one computing device 1302 and/or processing systems 1304) to implement techniques, modules, and examples described herein.

The techniques described herein are supported by various configurations of the computing device 1302 and are not limited to the specific examples of the techniques described herein. This functionality is also implementable or partially implementable through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 abstracts resources and functions to connect the computing device 1302 with other computing devices. The platform 1316 also serves to abstract scaling of resources to provide a corresponding level of scale to encountered demand for the resources 1318 that are implemented via the platform 1316. Accordingly, in an interconnected device example, implementation of functionality described herein is distributable throughout the system 1300. For example, the functionality is implementable in part on the computing device 1302 as well as via the platform 1316 that abstracts the functionality of the cloud 1314.

Although the techniques have been described in language specific to structural features and/or methodological acts, it is to be understood that the techniques defined in the appended claims are not limited to the specific features or acts described. Rather, the specific features and acts are disclosed as example forms of implementing the claims.

What is claimed is:

1. A method comprising:

receiving, by a processing device, tutorial content from one or more media sources;

identifying, by the processing device, a plurality of procedural steps and a plurality of objects from the tutorial content using machine-learning;

determining, by the processing device, a plurality of dependencies between the plurality of procedural steps and the plurality of objects;

generating, by the processing device, a graph-based data structure of the tutorial content having a plurality of nodes interconnected by a plurality of edges based on the plurality of steps, the plurality of objects, and the plurality of dependencies; and presenting, by the processing device, a graph-based representation of the graph-based data structure for display in a user interface.

2. The method of claim 1, wherein the tutorial content includes a video tutorial, and the identifying the plurality of procedural steps and the plurality of objects from the tutorial content using machine-learning includes using at least one machine-learning model that is trained to identify each of the plurality of procedural steps from the video tutorial by extracting a respective step description, a respective step timestamp, and a respective step thumbnail from a video transcript and a plurality of video frames of the video tutorial.

3. The method of claim 2, wherein the at least one machine-learning model includes at least one first machine-learning model, and the identifying the plurality of procedural steps and the plurality of objects from the tutorial content using machine-learning includes using at least one second machine-learning model that is trained to identify each of the plurality of objects from the video tutorial by extracting a respective object name and a respective object bounding box from the video transcript and the plurality of video frames.

4. The method of claim 3, wherein the determining the plurality of dependencies from the tutorial content includes determining a dependency between a first object and a second object based on the respective object name of the first object with the respective object name of the second object.

5. The method of claim 3, wherein the determining the plurality of dependencies from the tutorial content includes determining a dependency between a procedural step and an object based on the respective step description of the procedural step with the respective object name of the object.

6. The method of claim 2, wherein the determining the plurality of dependencies from the tutorial content includes determining a dependency between a first procedural step and a second procedural step based on the respective step description of the first procedural step with the respective step description of the second procedural step.

7. The method of claim 2, wherein the determining the plurality of dependencies from the tutorial content includes determining a dependency between a first procedural step and a second procedural step based on determining that the respective step timestamp of the first procedural step precedes or follows the respective step timestamp of the second procedural step.

8. The method of claim 1, wherein:

the tutorial content includes one or more of video data, image data, audio data, text data, haptic-feedback data, diagram-data, and presentation data; and the media sources include one or more of a video source, an image source, an audio source, a text source, a haptic-feedback source, a document source, and a presentation source.

9. A non-transitory computer-readable medium storing executable instructions, which when executed by a processing device, cause the processing device to perform operations comprising:

receiving tutorial content from one or more media sources;

identifying a plurality of procedural steps from the tutorial content by extracting a respective step description and a respective step timestamp of each procedural step using one or more machine learning models;

identifying a plurality of objects from the tutorial content by extracting a respective object name and a respective object bounding box of each object using the one or more machine learning models;

determining a plurality of dependencies from the tutorial content; and generating a graph-based data structure of the tutorial content having a plurality of nodes representing the plurality of objects or the plurality of procedural steps interconnected by a plurality of edges based on the plurality of dependencies.

10. The non-transitory computer-readable medium of claim 9, wherein the operations further include presenting a graph-based representation of the graph-based data structure for display in a user interface.

11. The non-transitory computer-readable medium of claim 10, wherein the operations further include outputting the graph-based representation of the graph-based data structure for presentation at a remote computing device.

* * * * *